(12) United States Patent
Ikegami et al.

(10) Patent No.: US 8,479,603 B2
(45) Date of Patent: Jul. 9, 2013

(54) VEHICLE DRIVING SYSTEM

(75) Inventors: Takefumi Ikegami, Saitama (JP);
Shigetaka Kuroda, Saitama (JP);
Masahiro Takeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/426,198

(22) Filed: Mar. 21, 2012

(65) Prior Publication Data

US 2012/0234133 A1   Sep. 20, 2012

Related U.S. Application Data

(63) Continuation of application No. PCT/JP2010/067476, filed on Oct. 5, 2010.

(30) Foreign Application Priority Data

Oct. 5, 2009 (JP) .................................. 2009-231617
Oct. 5, 2009 (JP) .................................. 2009-231618

(51) Int. Cl.
*F16H 3/08* (2006.01)

(52) U.S. Cl.
USPC ........................................................ 74/330

(58) Field of Classification Search
USPC ..................... 74/330, 331, 333, 340
See application file for complete search history.

(56) References Cited

U.S. PATENT DOCUMENTS

| | | | |
|---|---|---|---|
| 5,839,800 A | 11/1998 | Koga et al. | |
| 6,126,251 A | 10/2000 | Yoshii et al. | |
| 7,056,264 B2 * | 6/2006 | Kupper et al. | 477/180 |
| 7,083,540 B2 * | 8/2006 | Janson et al. | 475/211 |
| 7,165,470 B2 * | 1/2007 | Sakamoto et al. | 74/339 |
| 7,611,433 B2 * | 11/2009 | Forsyth | 475/5 |
| 2006/0266144 A1 | 11/2006 | Schafter et al. | |
| 2008/0106227 A1 | 5/2008 | Gebert et al. | |

FOREIGN PATENT DOCUMENTS

| | | |
|---|---|---|
| EP | 2 067 680 A2 | 6/2009 |
| JP | 8-163707 A | 6/1996 |
| JP | 10-181389 A | 7/1998 |
| JP | 2000-110602 A | 4/2000 |
| JP | 2002-95106 A | 3/2002 |
| JP | 2005-147312 A | 6/2005 |
| JP | 2007-534899 A | 11/2007 |
| JP | 2009-179208 A | 8/2009 |

OTHER PUBLICATIONS

European Search Report Application No. 10822017.9 dated Mar. 19, 2013, pp. 8.

* cited by examiner

*Primary Examiner* — Ha D Ho
(74) *Attorney, Agent, or Firm* — Arent Fox LLP

(57) ABSTRACT

In a twin-clutch type transmission in which an electric motor is connected to one of transmission shafts, when downshifting is executed during EV running, a braking force is ensured by controlling in a cooperative fashion a regenerative brake and wheel brakes B1 to B4 so as to compensate for the loss of braking force during downshifting by the wheel brakes B1 to B4 or a braking force is ensured by making use of engine braking effects.

8 Claims, 19 Drawing Sheets

⟨1ST EV MODE⟩

FIG. 4  <3RD EV MODE REGENERATION>

VEHICLE DRIVING SYSTEM

CROSS-REFERENCE TO RELATED APPLICATION

This application is a Continuation Application of International Application No. PCT/JP2010/067476, having international filing date of Oct. 5, 2010, which claims priority to Japanese Patent Application No. 2009-231617 filed Oct. 5, 2009 and Japanese Patent Application No. 2009-231618 filed Oct. 5, 2009, the disclosure of the prior applications are hereby incorporated in their entirety by reference.

TECHNICAL FIELD

The present invention relates a vehicle driving system which includes an internal combustion engine and an electric motor.

BACKGROUND ART

Conventionally, with a view to preventing a shock that will result from a torque interruption occurring during a gear change based on a transmission in which gear change operations of a manual transmission with a high transmission efficiency are automated, there have been proposed vehicle driving systems for hybrid vehicles which include a twin-clutch type transmission in which two input shafts each have a gear group and can individually be connected to an engine via a corresponding clutch, and one of the input shafts can be driven by a motor generator (refer to Patent Literature 1).

In a vehicle driving system 200 of Patent Literature 1, as shown in FIG. 19, two input shafts 201, 202 are connected individually to an engine Eng via clutches C1, C2, and further, a motor generator MG is connected to the input shaft 202. In addition, by engaging a dog clutch 205, the input shaft 202 is connected to a countershaft 207 via a low-speed side gear train 206, and the input shaft 201 is connected to the countershaft 207 via a high-speed side gear train 209 by engaging a dog clutch 208.

It is disclosed that the motor generator MG is driven by a driving force from the countershaft 207 so as to generate electricity through regeneration, and when the clutch C2 is engaged, the motor generator MG is driven by the engine Eng to thereby generate electricity.

RELATED ART LITERATURE

Patent Literature

Patent Literature: JP-A-2005-147312

SUMMARY OF THE INVENTION

Problem that the Invention is to Solve

In the vehicle driving system 200, however, nothing is described as to how to generate a braking force while the vehicle is driven on the motor. In general, in the hybrid vehicle, it is an important issue to generate electricity by the motor with good efficiency by making use of the braking force of the vehicle.

The invention has been made in view of these situations and an object thereof is to provide a vehicle driving system which can generate electricity by making use of the braking force while the vehicle is running on the motor.

Means for Solving the Problem

A first aspect of the invention provides a vehicle driving system (e.g., vehicle driving systems 1, 1A in embodiment) comprising an internal combustion engine (e.g., engines 6 in embodiment) and an electric motor (e.g., motors 7 in embodiment), the system comprising:

an internal combustion engine output shaft (e.g., crankshafts 6a in embodiment) by which power is outputted from the internal combustion engine;

a first input shaft (e.g., first output shafts 11 in embodiment) which is disposed parallel to the internal combustion engine output shaft and which is selectively connected to the internal combustion engine output shaft by a first engaging and disengaging unit (e.g., first clutches 41 in embodiment);

a second input shaft (e.g., second intermediate shafts 16 in embodiment) which is disposed parallel to the internal combustion engine output shaft and which is selectively connected to the internal combustion engine output shaft by a second engaging and disengaging unit (e.g., a second clutch 42 in embodiment);

an output/input shaft (e.g., countershafts 14 in embodiment) which is disposed parallel to the internal combustion engine output shaft and which outputs power to a driven portion (e.g., drive wheels DW, DW in embodiment);

a first gear group which is disposed on the first input shaft and which includes a plurality of gears (e.g., third speed drive gears 22a, fifth speed drive gears 25a, a seventh speed drive gear 97a in embodiment) which are selectively connected to the first input shaft via a first changeover unit (e.g., first change-speed shifters 51, 51A, a third change-speed shifter 52B, locking mechanisms 61 in embodiment);

a second gear group which is disposed on the second input shaft and which includes a plurality of gears (e.g., second speed drive gears 22a, fourth speed drive gears 24a, a sixth speed drive gear 96a in embodiment) which are selectively connected to the second input shaft via a second changeover unit (e.g., second change-speed shifters 52, 52A, a fourth change-speed shifter 52B in embodiment); and a third gear group which is disposed on the output/input shaft and which includes a plurality of gears (e.g., first common driven gears 23b, second common driven gears 24b, a third common driven gear 96 in embodiment) with which the gears of the first gear group and the gears of the second gear group mesh, wherein, when the vehicle is decelerated during an EV running by selecting a high-speed side gear of the first gear group, a braking force during a downshift is ensured by actuating wheel brakes in a cooperative fashion so as to compensate for a reduction in regenerative braking force of the electric motor during a downward gear change from the high-speed side gear to a low-speed side gear while regeneration is brought about by the electric motor.

A second aspect provides, based on the first aspect, the system, wherein the first changeover unit is a synchro clutch.

A third aspect provides, based on either of the first or second aspect, the system, wherein, when a vehicle speed is decreased to a predetermined value by bringing about a regeneration by selecting the low-speed side gear, the regeneration is stopped, and a low-speed side gear which is lower than the low-speed side gear is selected.

A fourth aspect provides, based on one of the other aspects, the system, wherein a regeneration amount can be increased in accordance with a pedal effort applied to a brake pedal (e.g., brake pedals 111 in embodiment), and a braking force is ensured by controlling a hydraulic pressure of a master cylinder (e.g., master cylinders M in embodiment) for the first time after the regeneration amount reaches a regeneration limit.

A fifth aspect provides a vehicle driving system (e.g., vehicle driving systems 1, 1A in embodiment) comprising an internal combustion engine (e.g., engines 6 in embodiment) and an electric motor (e.g., motors 7 in embodiment), the system comprising:

an internal combustion engine output shaft (e.g., crankshafts 6a in embodiment) by which power is outputted from the internal combustion engine;

a first input shaft (e.g., first output shafts 11 in embodiment) which is disposed parallel to the internal combustion engine output shaft and which is selectively connected to the internal combustion engine output shaft by a first engaging and disengaging unit (e.g., first clutches 41 in embodiment);

a second input shaft (e.g., second intermediate shafts 16 in embodiment) which is disposed parallel to the internal combustion engine output shaft and which is selectively connected to the internal combustion engine output shaft by a second engaging and disengaging unit (e.g., a second clutch 42 in embodiment);

an output/input shaft (e.g., countershafts 14 in embodiment) which is disposed parallel to the internal combustion engine output shaft and which outputs power to a driven portion (e.g., drive wheels DW, DW in embodiment);

a first gear group which is disposed on the first input shaft and which includes a plurality of gears (e.g., third speed drive gears 22a, fifth speed drive gears 25a, a seventh speed drive gear 97a in embodiment) which are selectively connected to the first input shaft via a first changeover unit (e.g., first change-speed shifters 51, 51A, a third change-speed shifter 52B, locking mechanisms 61 in embodiment);

a second gear group which is disposed on the second input shaft and which includes a plurality of gears (e.g., second speed drive gears 22a, fourth speed drive gears 24a, a sixth speed drive gear 96a in embodiment) which are selectively connected to the second input shaft via a second changeover unit (e.g., second change-speed shifters 52, 52A, a fourth change-speed shifter 52B in embodiment); and a third gear group which is disposed on the output/input shaft and which includes a plurality of gears (e.g., first common driven gears 23b, second common driven gears 24b, a third common driven gear 96 in embodiment) with which the gears of the first gear group and the gears of the second gear group mesh, wherein, when the vehicle is decelerated during an EV running by selecting a high-speed side gear of the first gear group, a braking force during a downshift is ensured by making use of engine braking effects by engaging the second engaging and disengaging unit in such a state that the internal combustion engine is started and one of the gears of the second gear group is selected by the second changeover unit during a downward gear change from the high-speed side gear to a low-speed side gear while regeneration is brought about by the electric motor.

A sixth aspect provides, based on the fifth aspect, the system, wherein the system estimates a deceleration request, and wherein, when a deceleration request to the low-speed side gear of the first gear group is made while the regeneration is being brought about by the high-speed side gear of the first gear group, engine braking is once attained in such a state that the gear of the second gear group is selected, and a pre-downshift from the high-speed gear to the low-speed side gear of the first gear group is made while the vehicle is running on the gear of the second gear group.

A seventh aspect provides, based on either of the fifth or sixth aspect, the system, wherein the first changeover unit is a synchro clutch.

An eight aspect provides, based on one of the fifth, sixth, or seventh aspects, the system, wherein, when a vehicle speed is decreased to a predetermined value (e.g., a vehicle speed Vf in embodiment) by bringing about a regeneration by selecting the low-speed side gear, the regeneration is stopped, and a low-speed side gear which is lower than the low-speed side gear is selected.

Advantage of the Invention

According to the first aspect, when decelerating the vehicle during the EV running, by ensuring the braking force by actuating the wheel brakes in cooperation with the regenerative braking by the electric motor, energy discharged from the wheel brakes as thermal energy can be made effective use of as regenerative energy. In addition, the vehicle is decelerated in accordance with the vehicle speed, and therefore, when the vehicle is reaccelerated, the vehicle can be accelerated in a smooth fashion.

According to the second aspect, the gear change can be performed smoothly.

Additionally, the loss of regenerative torque (braking force) as a result of the use of the synchro clutch is compensated for by engine braking, which can be made effective use of as regenerative energy.

According to the third aspect, when the vehicle speed is decreased to a regeneration impossible speed by the regeneration of the electric motor, the low-speed side gear which is lower than the low-speed side gear is selected to put the vehicle ready for reacceleration or start from standstill, thereby making it possible to smoothly accelerate or start the vehicle from standstill.

According to the fourth aspect, the vehicle can be slowed down by making full use of the regeneration of the electric motor.

According to the fifth aspect, when decelerating the vehicle during the EV running, by compensating for the loss of braking force during downshifting by engine braking effects, energy discharged by the mechanical brakes as thermal energy can be made effective use of as regenerative energy. In addition, the vehicle is decelerated in accordance with the vehicle speed, when reaccelerating the vehicle, the vehicle can be accelerated in a smooth fashion.

According to the sixth aspect, when decelerating the vehicle during the EV running, the utilization efficiency of energy can be increased by performing downshifting while making use of engine braking effects.

According to the seventh aspect, the gear change can be performed smoothly.

In addition, the loss of regenerative torque (braking force) as a result of the use of the synchro clutch is compensated for by the engine braking, which can be made effective use of as regenerative energy.

According to the eighth aspect, when the vehicle speed is decreased to a regeneration impossible speed by the regeneration of the electric motor, the low-speed side gear which is lower than the low-speed side gear is selected to put the vehicle ready for reacceleration or start from standstill, thereby making it possible to smoothly accelerate or start the vehicle from standstill.

MODE FOR CARRYING OUT THE INVENTION

Hereinafter, embodiments of vehicle driving systems of the invention will be described by reference to the drawings.

First Embodiment

Figure 1:
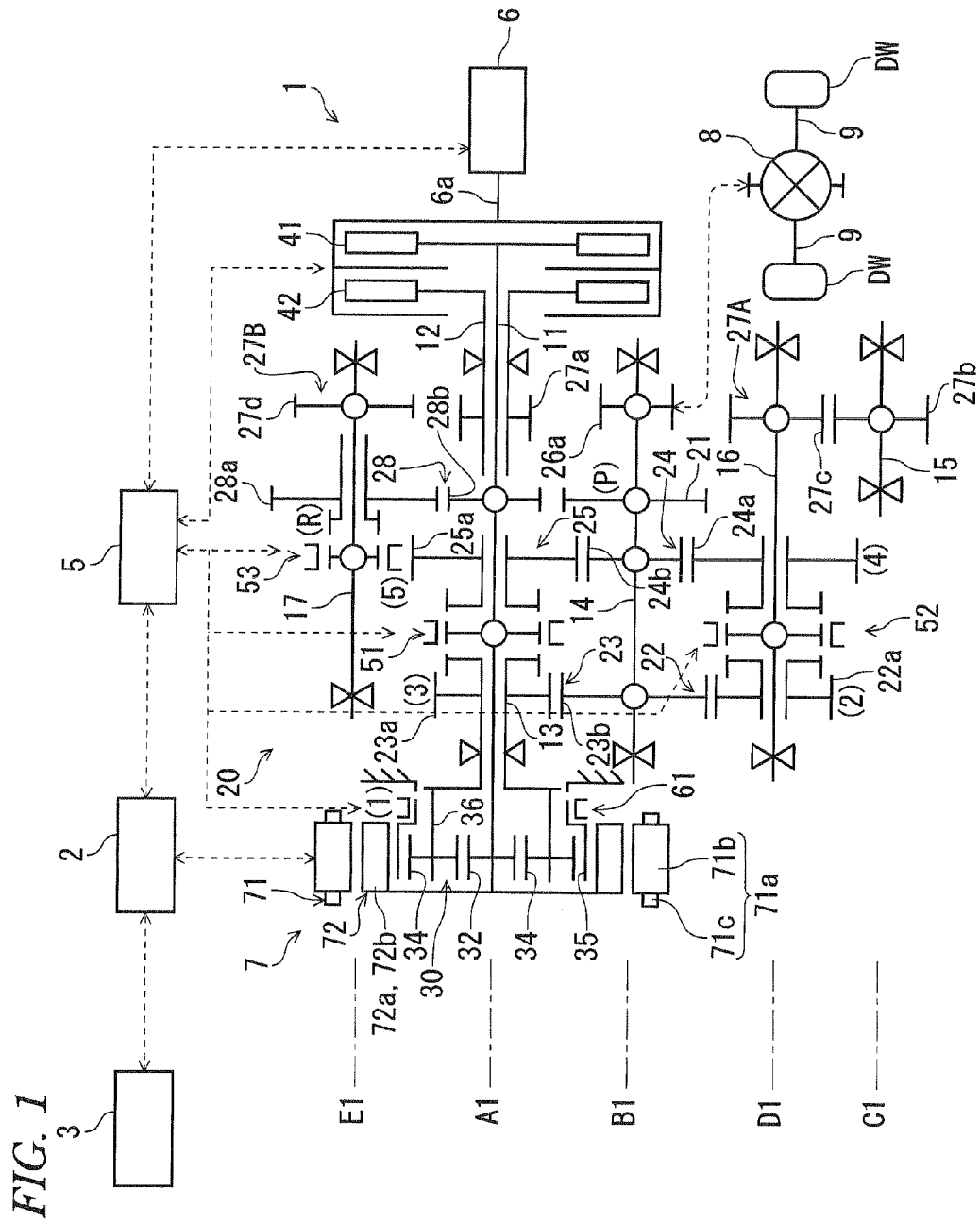
FIG. 1 is a schematic diagram showing a vehicle driving system according to a first embodiment of the invention.

As shown in FIG. 1, a vehicle driving system 1 of a first embodiment is for driving drive wheels DW, DW (a driven portion) via drive shafts 9, 9 of a vehicle (not shown) and includes an internal combustion engine (hereinafter, referred to as an engine) 6 which is a drive source, an electric motor (hereinafter, referred to as a motor) 7, a transmission 20 for transmitting power to the drive wheels DW, DW, and a planetary gear mechanism 30 as a differential reduction gear mechanism which constitutes part of the transmission 20.

The engine 6 is a gasoline engine, for example, and a first clutch 41 (a first engaging and disengaging unit) and a second clutch 42 (a second engaging and disengaging unit) of the transmission 20 are provided on a crankshaft 6a of the engine 6.

The motor 7 is a three-phase brushless DC motor and has a stator 71 which includes 3n armatures 71a and a rotor 72 which is disposed so as to face the stator 71.

Each armature 71a includes an iron core 71b and a coil which is wound around the iron core 71b and is fixed to a casing, not shown. The armatures 71a are aligned circumferentially at almost equal intervals about a rotating shaft. The 3n coils 71c make up n sets of three-phase coils of U-phase, V-phase and W-phase.

The rotor 72 has n permanent magnets 72a which is aligned at almost equal intervals about the rotating shaft, and polarities of any two adjacent permanent magnets 72a are different from each other. A fixing portion 72b which fixed each permanent magnet 72a in place has a hollow cylindrical shape which is made of a magnetically soft material. The fixing portions 72b are disposed on an outer circumferential side of a ring gear 35 and are connected to a sun gear 32 of the planetary gear mechanism 30. By adopting this configuration, the rotor 72 is made to rotate together with the sun gear 32 of the planetary gear mechanism 30.

The planetary gear mechanism 30 has the sun gear 32, the ring gear 35 which is disposed concentrically with the sun gear 32 and is disposed so as to surround the periphery of the sun gear 32, planetary gears 34 which mesh with the sun gear 32 and the ring gear 35, and a carrier 36 which supports the planetary gears 34 so as to rotate on their own axes and walk around the sun gear 32 and the ring gear 35. In this way, the sun gear 32, the ring gear 35 and the carrier 36 are made to rotate differentially relative to each other.

A lock mechanism 61 is provided on the ring gear 35, and this lock mechanism 61 has a synchronizing mechanism (a synchronizer mechanism) and is made to stop (lock) the rotation of the ring gear 35.

The transmission 20 is a so-called twin-clutch type transmission which includes the first clutch 41 and the second clutch 42, the planetary gear mechanism 30 and a plurality of change-speed gear groups, which will be described later.

More specifically, the transmission 20 includes a first main shaft 11 (a first input shaft) which is disposed concentrically with the crankshaft 6a of the engine 6 (a rotating axis A1), a second main shaft 12, a connecting shaft 13, a countershaft 14 (an output/input shaft) which can rotate about a rotating axis B1 which is disposed parallel to the rotating axis A1, a first intermediate shaft 15 which can rotate about a rotating axis C2 which is disposed parallel to the rotating axis A1, a second intermediate shaft 16 (a second input shaft) which can rotate about a rotating axis D1 which is disposed parallel to the rotating axis A1, and a reverse shaft 17 which can rotate about a rotating axis E1 which is disposed parallel to the rotating axis A1.

The first clutch 41 is provided on the first main shaft 11 on a side which faces the engine 6, and the sun gear 32 of the planetary gear mechanism 30 and the rotor 72 of the motor 7 are mounted on the first main shaft 11 on an opposite side to the side facing the engine 6.

Consequently, the first main shaft 11 is selectively connected to the crankshaft 6a of the engine 6 by the first clutch and is connected directly to the motor 7, so that power of the engine 6 and/or the motor is transmitted to the sun gear 32.

The second main shaft 12 is shorter than the first main shaft 11 and is hollow. The second main shaft 12 is disposed to rotate relative to the first main shaft 11 so as to cover the periphery of a portion of the first main shaft 11 which is situated on a side to face the engine 6. In addition, the second clutch 42 is provided on the second main shaft 12 on a side to face the engine 6, and an idler drive gear 27a is mounted integrally on the second main shaft 12 on an opposite side to the side facing the engine 6. Consequently, the second main shaft 12 is connected selectively to the crankshaft 6a of the engine 6 by the second clutch 42 so that power of the engine 6 is transmitted to the idler drive gear 27a.

The connecting shaft 13 is shorter than the first main shaft 11 and is hollow. The connecting shaft 13 is disposed to rotate relative to the first main shaft 11 so as to cover a portion of the first main shaft 11 which is situated on an opposite side to a side facing the engine 6. A third speed drive gear 23a is mounted integrally on the connecting shaft 13 on a side which faces the engine 6, and the carrier 36 of the planetary gear mechanism 30 is mounted integrally on the connecting shaft 13 on an opposite side to the side facing the engine 6. Consequently, the carrier 36 which is mounted on the connecting shaft 13 and the third speed drive gear 23a are made to rotate together when the planetary gears 34 walk around the sun gear 32 and the ring gear 35.

Further, a fifth speed drive gear 25a is provided on the main shaft 11 between the third speed drive gear 23a which is mounted on the connecting shaft 13 and the idler drive gear 27a which is mounted on the second main shaft 12 so as to rotate relative to the first main shaft 11. Additionally, a reverse driven gear 28b is mounted on the first main shaft 11 so as to rotate together with the first main shaft 11. Further, a first change-speed shifter 51 is provided between the third speed drive gear 23a and the fifth speed drive gear 25a, the first change-speed shifter 51 being adapted to connect the first main shaft 11 and the third speed drive gear 23a or the fifth speed drive gear 25a or release the connection. Then, when the first change-speed shifter 51 is engaged in a third speed connecting position, the first main shaft 11 and the third speed drive gear 23a are connected together so as to rotate together. When the first change-speed shifter 51 is engaged in a fifth speed connecting position, the first main shaft 11 and the fifth speed drive gear 25a are connected together so as to rotate together. When the first change-speed shifter 51 is in a neutral position, the first main shaft 11 rotates relative to the third speed drive gear 23a and the fifth speed drive gear 25a. When the first main shaft 11 and the third speed drive gear 23a rotate together, the sun gear 32 which is mounted on the first main shaft 11 and the carrier 36 which is connected to the third speed drive gear 23a by the connecting shaft 13 rotate together, and the ring gear 35 also rotate together, whereby the planetary gear mechanism 30 works as a unit.

A first idler driven gear 27b is mounted integrally on the first intermediate shaft 15, and this first idler driven gear 27b meshes with the idler drive gear 27a which is mounted on the second main shaft 12.

A second idler driven gear 27c is mounted integrally on the second intermediate shaft 16, and this second idler driven gear 27c meshes with the first idler driven gear 27b which is mounted on the first intermediate shaft. The second idler driven gear 27c makes up a first idler gear train 27A together with the idler drive gear 27a and the first idler driven gear 27b.

A second speed drive gear 22a and a fourth speed drive gear 24a, which can rotate relative to the second intermediate shaft 16, are provided on the second intermediate shaft 16 in positions which correspond to the third speed drive gear 23a and the fifth speed drive gear 25a which are provided around the first main shaft 11. Further, a second change-speed shifter 52 is provided on the second intermediate shaft 16 between the second speed drive gear 22a and the fourth speed drive gear 24a, and this second change-speed shifter 52 connects the second intermediate shaft 16 and the second speed drive gear 22a or the fourth speed drive gear 24a or releases the connection. Then, the second change-speed shifter 52 is engaged in a second speed connecting position, the second intermediate shaft 16 and the second speed drive gear 22a rotate together, while the second change-speed shifter 52 is engaged in a fourth speed connecting position, the second intermediate shaft 16 and the fourth speed drive gear 24a rotate together. When the second change-speed shifter 52 is in a neutral position, the second intermediate shaft 12 rotates relative to the second speed drive gear 22a and the fourth speed drive gear 24a.

A first common driven gear 23b, a second common driven gear 24b, a park gear 21, and a final gear 26a are mounted integrally on the countershaft 14 sequentially in that order from an opposite side to a side which faces the engine 6.

Here, the first common driven gear 23b meshes with the third speed drive gear 23a which is mounted on the connecting shaft 13 and makes up a third speed gear pair together with the third speed drive gear 23a. In addition, the first common driven gear 23b meshes with the second speed drive gear 22a which is provided on the second intermediate shaft 16 and makes up a second speed gear pair 22 together with the second speed drive gear 22a.

The second common driven gear 24b meshes with the fifth speed drive gear 25a which is provided on the first main shaft 11 and makes up a fifth speed gear pair 25 together with the fifth speed drive gear 25a. The second common driven gear 24b meshes with the fourth speed drive gear 24a which is provided on the second intermediate shaft 16 and makes up a fourth speed gear pair 24 together with the fourth speed drive gear 24a.

The final gear 26a meshes with the differential gear mechanism 8, and the differential gear mechanism 8 is connected to the drive wheels DW, DW via the drive shafts 9, 9. Consequently, power transmitted to the countershaft 14 is outputted from the final gear 26a to the drive wheels DW, DW via the differential gear mechanism 8 and the drive shafts 9, 9.

A third idler driven gear 27d is mounted integrally on the reverse shaft 17, and this third idler driven gear 27d meshes with the first idler driven gear 27b which is mounted on the first intermediate shaft 15. The third idler driven gear 27d makes up a second idler gear train 27B together with the idler drive gear 27a and the first idler driven gear 27b. A reverse drive gear 28a is provided on the reverse shaft 17 so as to rotate relative to the reverse shaft 17, and this reverse drive gear 28a meshes with a reverse driven gear 28b which is mounted on the first main shaft 11. The reverse drive gear 28a makes up a reverse gear train 28 together with the reverse driven gear 28b. Further, a reverse shifter 53 is provided on an opposite side of the reverse drive gear 28a to a side which faces the engine 6, and this reverse shifter 53 connects the reverse shaft 17 and the reverse drive gear 28a or release the connection. Then, when the reverse shifter 53 is engaged in a reverse connecting position, the reverse shaft 17 and the reverse drive gear 28*a* rotate together, while when the reverse shifter 53 is in a neutral position, the reverse shaft 17 and the reverse drive gear 28*a* rotate relative to each other.

The first change-speed shifter 51, the second change-speed shifter 52 and the reverse change-speed shifter 53 employ a clutch mechanism having a synchronizing mechanism (a synchronizer mechanism) which makes the revolution speed of the gear match the revolution speed of the shaft to which the gear is connected.

In the transmission 20 which is configured as has been described heretofore, an odd speed gear group (a first gear group) made up of the third speed drive gear 23*a* and the fifth speed drive gear 25*a* is provided on the first main shaft 11 which is one change-speed shaft of two change-speed shafts. In addition, an even speed gear group (a second gear group) which is made up of the second speed drive gear 22*a* and the fourth speed drive gear 24*a* is provided on the second intermediate shaft 16 which is the other change-speed shaft of the two change-speed shafts.

Based on the configuration that has been described heretofore, the vehicle driving system 1 of this embodiment has the following first to fifth transmission paths.

(1) A first transmission path is a transmission path where the crankshaft 6*a* of the engine 6 is connected to the drive wheels DW, DW via the first main shaft 11, the planetary gear mechanism 30, the connecting shaft 13, the third speed gear pair 23 (the third speed drive gear 23*a*, the first common driven gear 23*b*), the countershaft 14, the final gear 26*a*, the differential gear mechanism 8 and the drive shafts 9, 9. Here, a reduction ratio of the planetary gear mechanism 30 is set so that engine torque transmitted to the drive shafts DW, DW via the first transmission path corresponds to a first speed. Namely, a reduction ratio resulting by multiplying the reduction ratio of the planetary gear mechanism 30 by a reduction ratio of the third speed gear pair 23 corresponds to the first speed.

(2) A second transmission path is a transmission path where the crankshaft 6*a* of the engine 6 is connected to the drive wheels DW, DW via the second main shaft 12, the first idler gear train 27A (the idler drive gear 27*a*, the first idler driven gear 27*b*, the second idler driven gear 27*c*), the second intermediate shaft 16, the second speed gear pair 22 (the second speed drive gear 22*a*, the first common driven gear 23*b*) or the fourth speed gear pair 24 (the fourth speed drive gear 24*a*, the second common driven gear 24*b*), the countershaft 14, the final gear 26*a*, the differential gear mechanism 8 and the drive shafts 9, 9.

(3) A third transmission path is a transmission path where the crankshaft 6*a* of the engine 6 is connected to the drive wheels DW, DW via the first main shaft 11, the third speed gear pair 23 (the third speed drive gear 23*a*, the first common driven gear 23*b*) or the fifth speed gear pair 25 (the fifth speed drive gear 25*a*, the second common driven gear 24*b*), the countershaft 14, the final gear 26*a*, the differential gear mechanism 8 and the drive shafts 9, 9 without passing by the planetary gear mechanism 30.

(4) A fourth transmission path is a transmission path where the motor 7 is connected to the drive wheels DW, DW via the planetary gear mechanism 30 or the third speed gear pair 23 (the third speed drive gear 23*a*, the first common driven gear 23*b*) or the fifth speed gear pair 25 (the fifth speed drive gear 25*a*, the second common driven gear 24*b*), the countershaft 14, the final gear 26*a*, the differential gear mechanism 8 and the drive shafts 9, 9.

(5) A fifth transmission path is a transmission path where the crankshaft 6*a* of the engine 6 is connected to the drive wheels DW, DW via the second main shaft 12, the second idler gear train 27B (the idler drive gear 27*a*, the first idler driven gear 27*b*, the third idler driven gear 27*d*), the reverse shaft 17, the reverse gear train 28 (the reverse drive gear 28*a*, the reverse driven gear 28*b*), the planetary gear mechanism 30, the connecting shaft 13, the third speed gear pair 23 (the third speed drive gear 23*a*, the first common driven gear 23*b*), the countershaft 14, the final gear 26*a*, the differential gear mechanism 8 and the drive shafts 9, 9.

In addition, in the vehicle driving system of this embodiment, the motor 7 is connected to a battery 3 via a power control unit (hereinafter, referred to as PDU) 2 which controls the operation thereof, whereby an electric power supply to the motor 7 from the battery 3 and an energy regeneration to the battery 7 are implemented via the PDU 2. Namely, the motor 7 is driven by the electric power supplied thereto from the battery 3 via the PDU 2. In addition, a regenerative electricity generation is implemented by the rotation of the drive wheels DW, DW or the power of the engine 6 when the vehicle is decelerated so as to charge the battery 3 (energy recovery). Further, the PDU 2 is connected to an electronic control unit (hereinafter, referred to as an ECU) 5. The ECU 5 is a control unit for controlling the whole vehicle in various ways. Inputted into the ECU 5 are an acceleration request, a braking request, engine revolution speed, motor revolution speed, motor temperature, revolution speeds of the first and second main shafts 11, 12, revolution speed of the countershaft 14, vehicle speed, gear position, SOC. On the other hand, outputted from the ECU 5 are a signal controlling the engine 6, a signal controlling the motor 7, signals indicating electricity generation state, charged state and discharged state of the battery 3, signals controlling the first and second change-speed shifters 51, 52, a signal controlling the reverse shifter 53, and a signal controlling the locking by the lock mechanism 61. Additionally, the ECU 5 controls a brake system 100, which will be described later and also controls the braking of the vehicle driving system 1.

The vehicle driving system 1 which is configured as has been described heretofore controls the engagement and disengagement of the first and second clutches 41, 42 and also controls the connecting positions of the first change-speed shifter 51, the second change-speed shifter 52 and the reverse shifter 53 to thereby run the vehicle at the first to fifth speeds and reverse by the engine 6. Additionally, the vehicle driving system 1 can assist in running the vehicle or perform a regenerative operation using the motor 7 while the vehicle is running. Further, the vehicle driving system 1 can start the engine 6 using the motor 7 or charge the battery 3 during idling.

Figure 2:
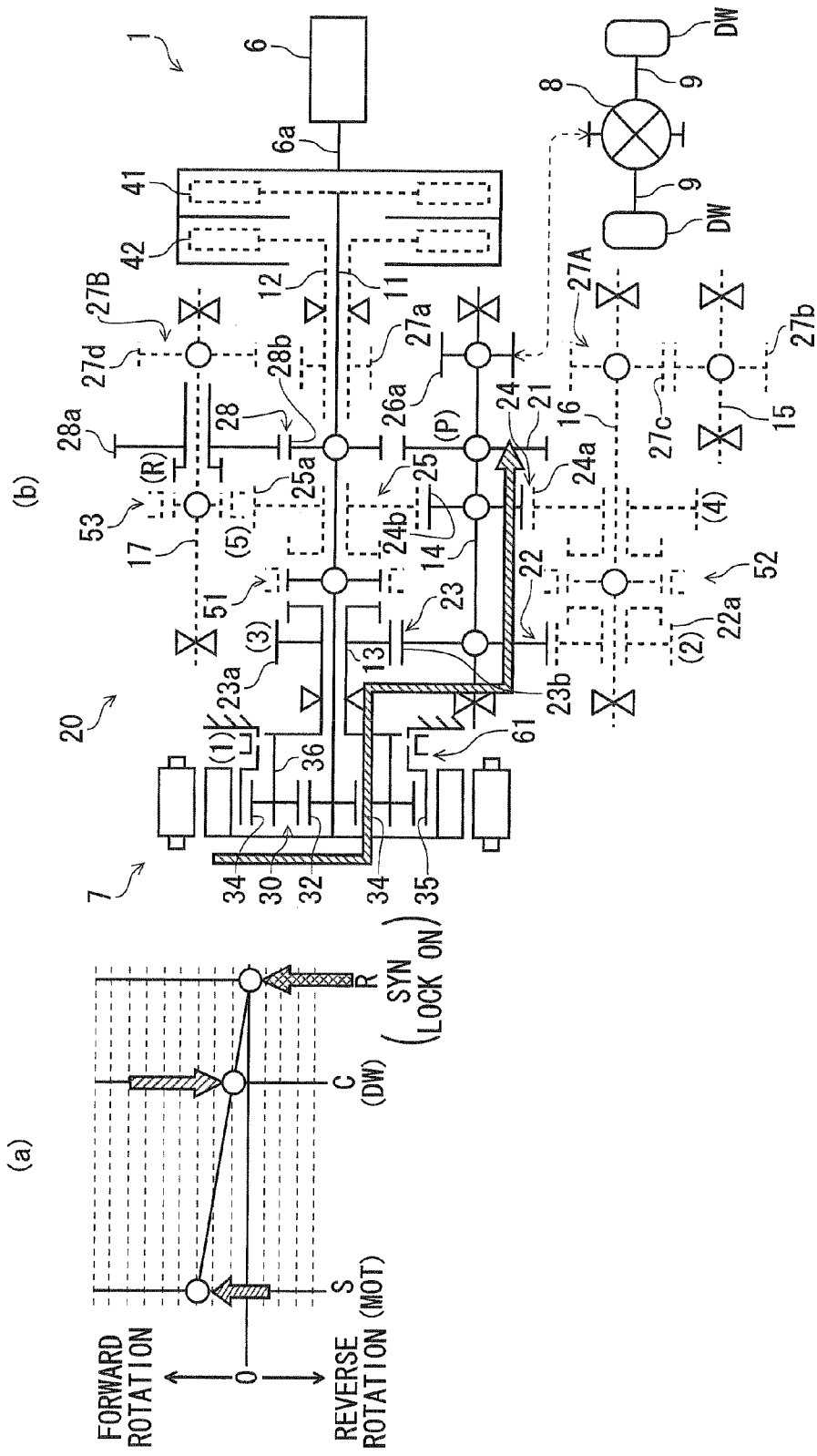
FIG. 2 shows diagrams illustrating a 1$^{st}$ EV mode, of which (a) is a speed diagram, and (b) is a diagram showing torque transmitting conditions of the vehicle driving system.
Figure 3:
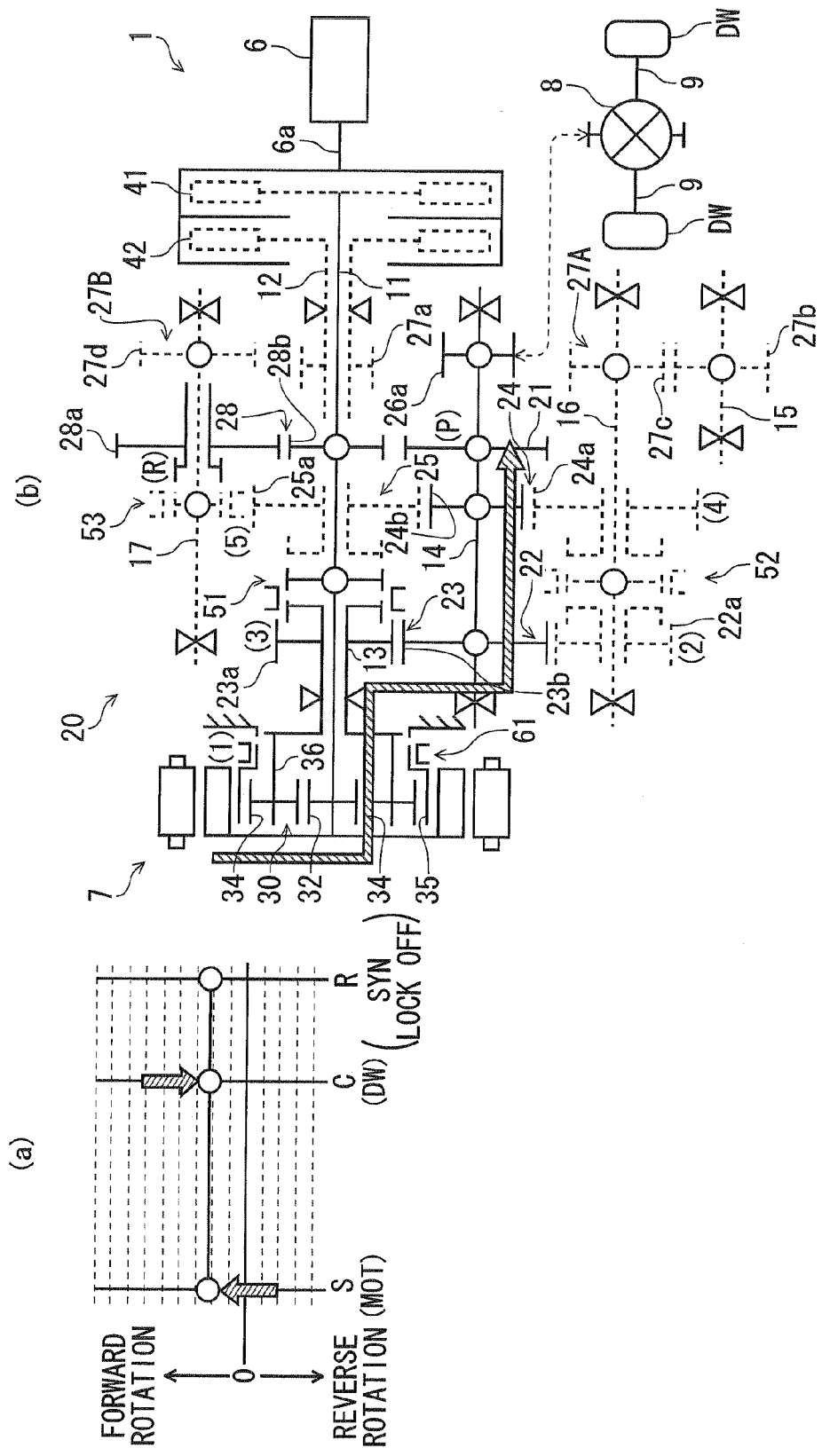
FIG. 3 shows diagrams illustrating a 3$^{rd}$ EV mode, of which (a) is a speed diagram, and (b) is a diagram showing torque transmitting conditions of the vehicle driving system.

Additionally, the vehicle driving system 1 enables an EV running by use of the motor 7. The vehicle driving system 1 includes three EV running modes. In the following description, unless otherwise stipulated, the first and second clutches 41, 42 are disengaged, the first and second change-speed shifter and reverse shifter 51 to 53 are in the neutral position, and the lock mechanism 61 is in a lock-off state (SYN LOCK OFF) which permits the rotation of the ring gear 35. Hereinafter, this state will be referred to as an initial state. In a speed diagram in FIG. 2(*a*), a stop position of the motor 7 is represented by 0, an upper area than 0 represents a forward rotating direction, a lower area than 0 represents a reverse rotating direction, the sun gear 32 is denoted by "S," the carrier 36 is denoted by "C," and the ring gear 35 is denoted by "R." This will also be true with speed diagrams which will be described later. FIG. 2(*b*) is a diagram showing torque transmitting conditions. A thick hatched arrow indicates a flow of torque, and hatching in the arrow corresponds to hatching in arrows indicating torque in the speed diagram. In addition, the forward rotating direction of the motor 7 denotes a direction in which a forward torque is transmitted to the drive wheels DW, DW via the drive shafts 9, 9, whereas the reverse rotating direction of the motor 7 denotes a direction in which a reverse torque is transmitted to the drive wheels DW, DW via the drive shafts 9, 9.

A first EV running mode is a $1^{st}$ EV mode which is attained from the initial state by putting the lock mechanism 61 in a lock state (SYN LOCK ON).

In this state, when the motor 7 is driven (torque is applied in the forward rotating direction), as shown in FIG. 2(a), the sun gear 32 of the planetary gear mechanism 30 which is connected to the rotor 72 rotates in the forward rotating direction.

As this occurs, as shown in FIG. 2(b), since the first and second clutches 41, 42 are disengaged, power transmitted to the sun gear 32 is never transmitted from the first main shaft 11 to the crankshaft 6a of the engine 6. Additionally, since the locking by the lock mechanism 61 is not implemented, motor torque transmitted to the sun gear 32 is transmitted to the carrier 36 and is then transmitted to the drive wheels DW, DW by way of the fourth transmission path which passes by way of the planetary gear mechanism 30. As this occurs, since the ring gear 35 is locked, the sun gear 32 rotates at a higher revolution speed than the carrier 36 while maintaining a collinear relation shown in FIG. 2(a) due to the characteristics of the planetary gear mechanism 30. Namely, the motor torque is transmitted which is reduced by the planetary gear mechanism 30.

A second EV running mode is a $3^{rd}$ EV mode which is attained from the initial state by engaging the first change-speed shifter 51 in the third speed connecting position from the neutral position. As has been described before, by engaging the first change-speed shifter 51 in the third speed connecting position, the planetary gear mechanism 30 is made into the single unit.

In this state, when the motor 7 is driven (torque is applied in the forward rotating direction), the planetary gear mechanism 30 which is connected to the rotor 72 rotates in the forward rotating direction as a unit. As this occurs, since the first and second clutches 41, 42 are disengaged, the power transmitted to the sun gear 32 is never transmitted from the first main shaft 11 to the crankshaft 6a of the engine 6. Then, the motor torque is transmitted to the drive wheels DW, DW by way of the fourth transmission which passes by way of the third speed gear pair 23.

Figure 4:
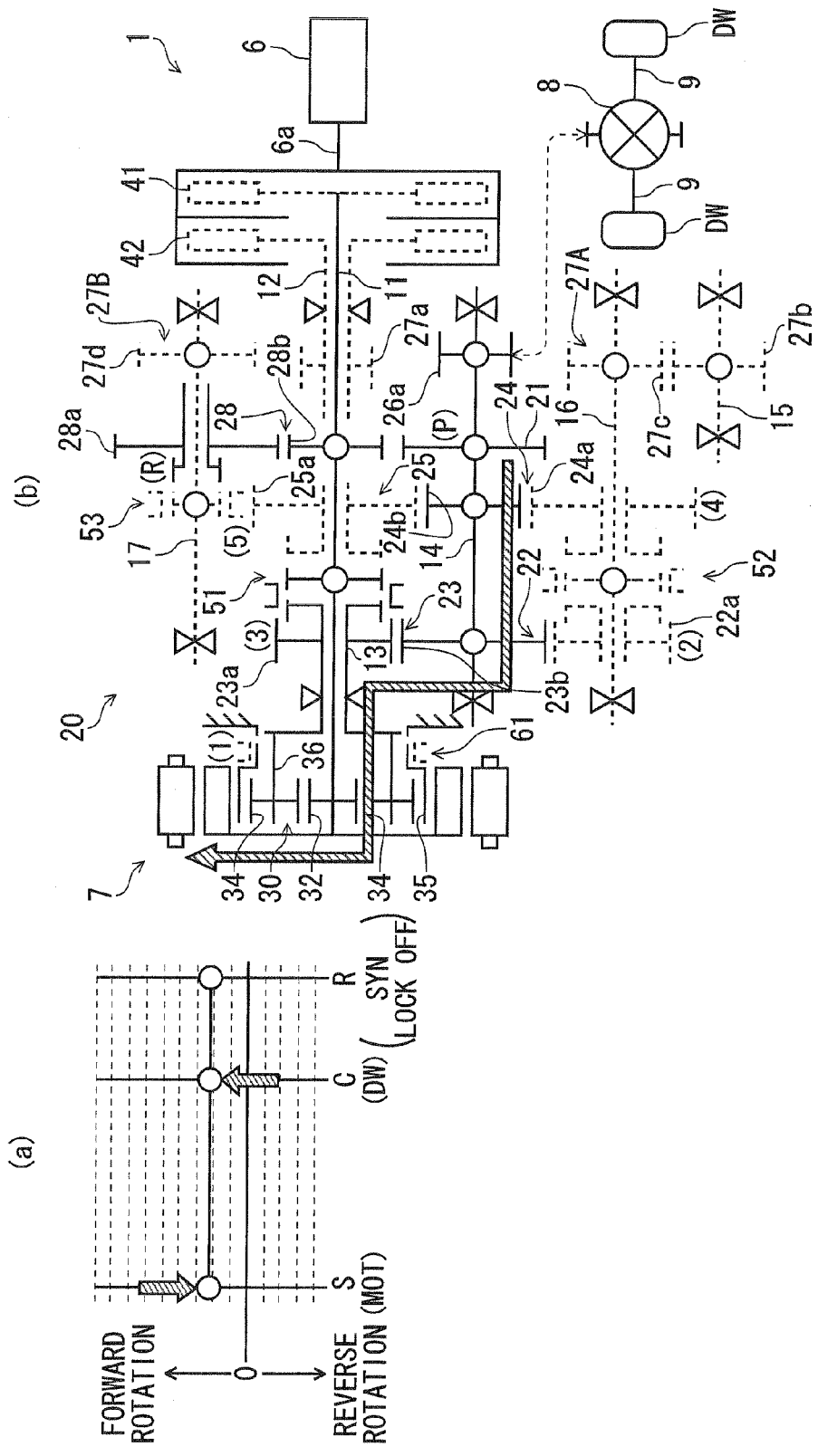
FIG. 4 shows diagrams illustrating a regeneration in the 3$^{rd}$ EV mode, of which (a) is a speed diagram, and (b) is a diagram showing torque transmitting conditions of the vehicle driving system.

When regeneration is implemented while the vehicle is running on the $3^{rd}$ EV running mode, as shown in FIG. 4, regenerative torque is applied to the motor 7 in a direction in which the revolution speed of the rotor 72 is reduced, that is, in a reverse direction, whereby electricity can be generated in the motor 7 while applying a braking force to the vehicle, thereby making it possible to charge the battery 3.

A third EV running mode is a $5^{th}$ EV mode which is attained from the initial state by engaging the first change-speed shifter 51 in the fifth speed connecting position from the neutral position.

Figure 5:
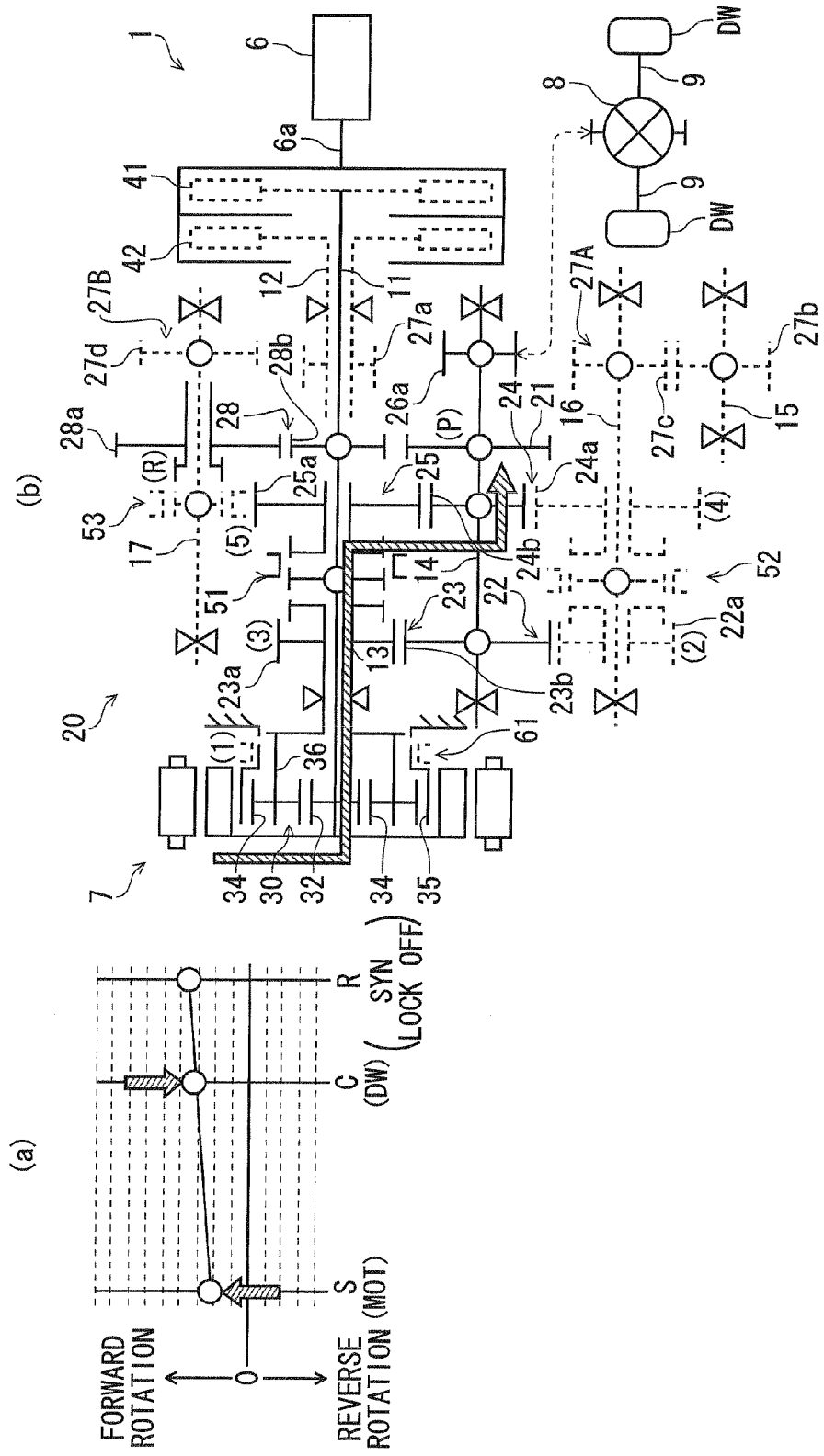
FIG. 5 shows diagrams illustrating a 5$^{th}$ EV mode, of which (a) is a speed diagram, and (b) is a diagram showing torque transmitting conditions of the vehicle driving system.

In this state, when the motor 7 is driven (torque is applied in the forward rotating direction, the sun gear 32 of the planetary gear mechanism 30 which is connected to the rotor 72 rotates in the forward rotating direction as shown in FIG. 5(b). As this occurs, as shown in FIG. 5(b), since the first and second clutches 41, 42 are disengaged, the power transmitted to the sun gear 32 is never transmitted from the first main shaft 11 to the crankshaft 6a of the engine 6. Then, the motor torque is transmitted to the drive wheels DW, DW by way of the fourth transmission path which passes by way of the fifth gear pair 25. As this occurs, the sun gear 32 rotates at the revolution speed of the motor 7 and the carrier 36 rotates while being connected to the countershaft 14 by way of the third speed gear train 23. Therefore, a predetermined differential rotation is generated between the sun gear 32 and the carrier 36, and the ring gear 35 rotates at a higher revolution speed than the carrier 36 while maintaining a collinear relation shown in FIG. 5(a) due to the characteristics of the planetary gear mechanism 30.

Figure 6:
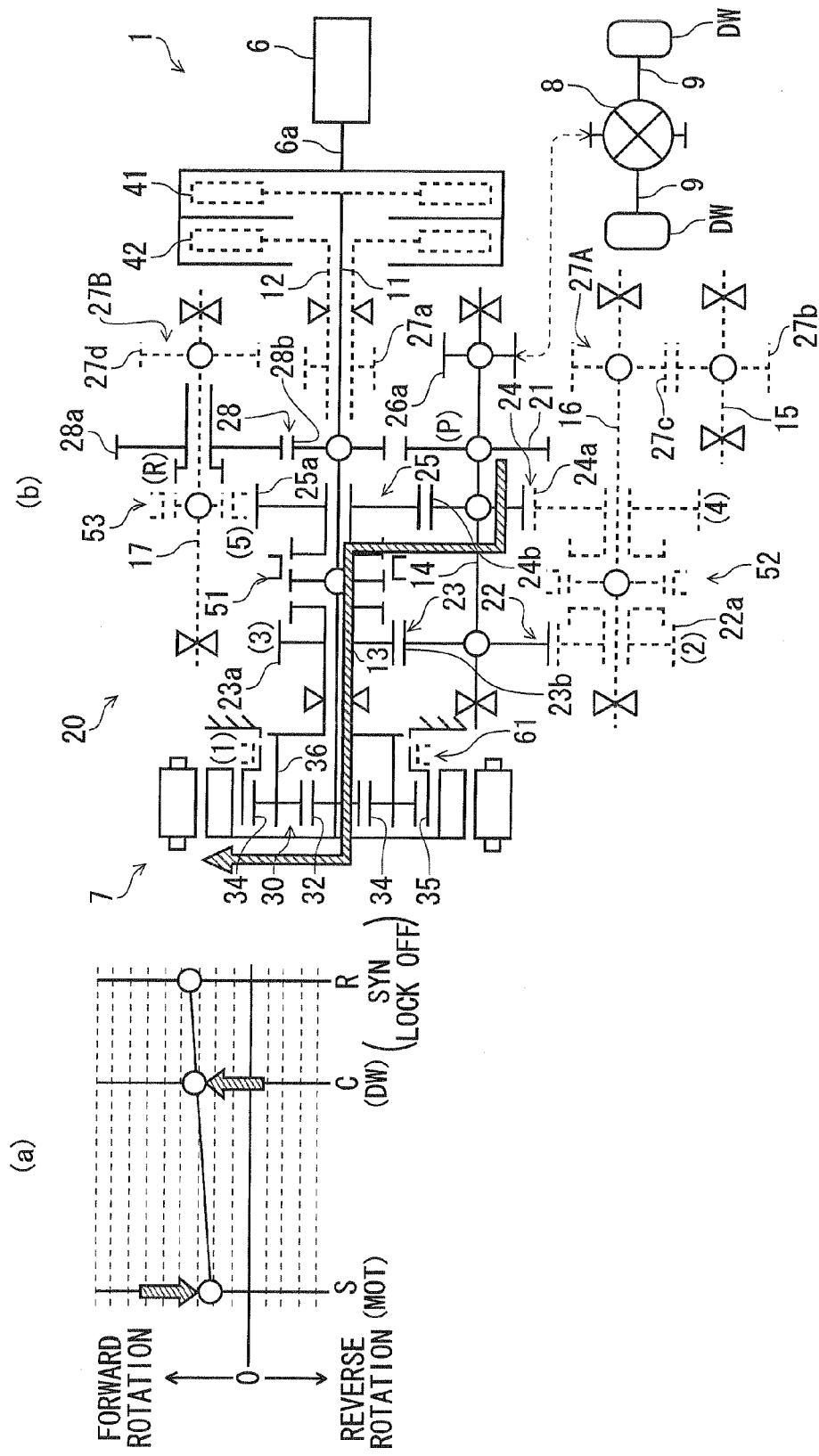
FIG. 6 shows diagrams illustrating a regeneration in the 5$^{th}$ EV mode, of which (a) is a speed diagram, and (b) is a diagram showing torque transmitting conditions of the vehicle driving system.

When regeneration is implemented while the vehicle is running on the $5^{th}$ EV running mode, as shown in FIG. 6, regenerative torque is applied to the motor 7 in the direction in which the revolution speed of the rotor 72 is reduced, that is, in the reverse direction, whereby electricity can be generated in the motor 7 while applying a braking force to the vehicle, thereby making it possible to charge the battery 3.

Following this, an example of a brake system which is used in the vehicle driving system 1 of the embodiment will be described.

Figure 7:
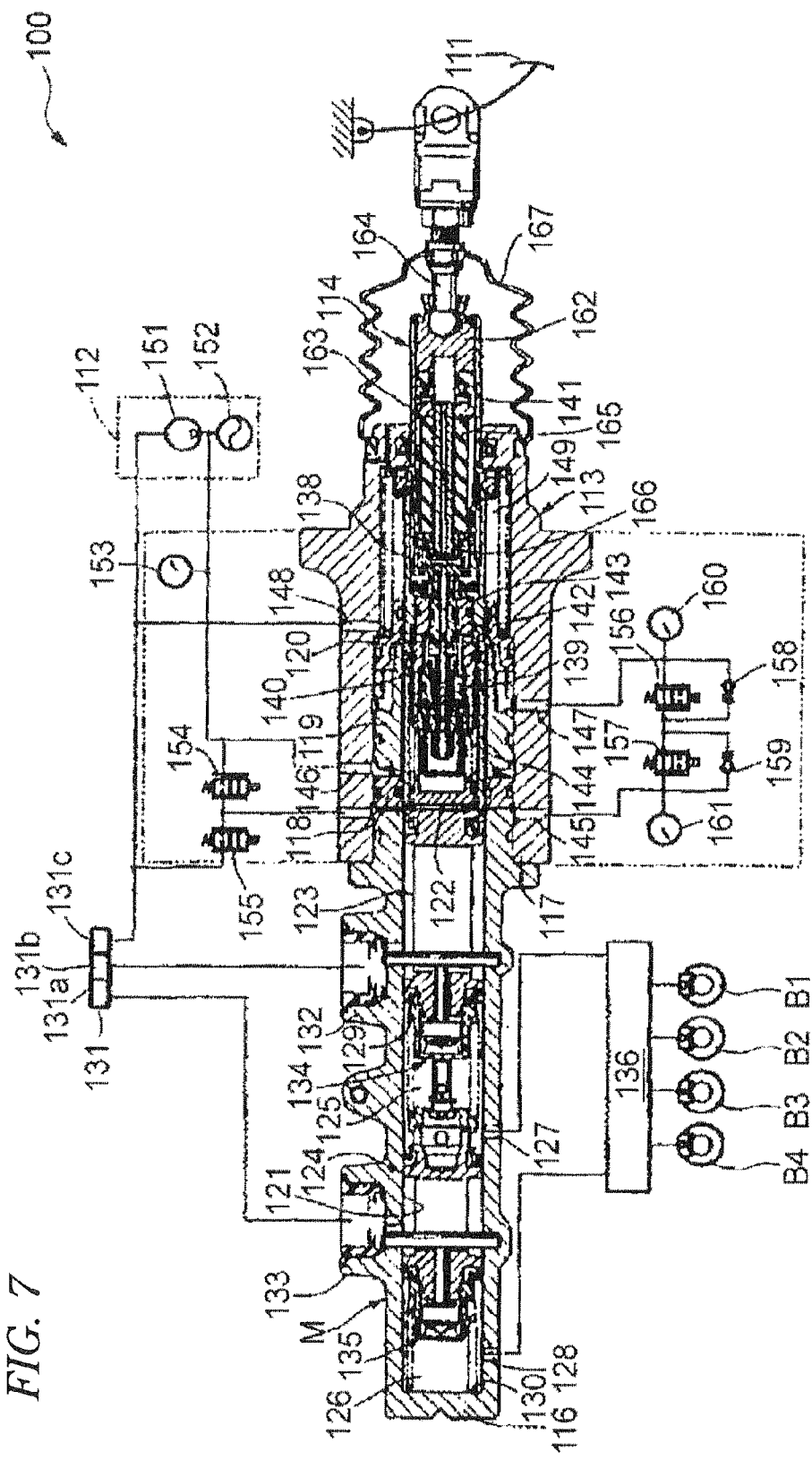
FIG. 7 is a schematic diagram of an example of a brake system which is used in the vehicle driving system of this embodiment.

As shown in FIG. 7, the brake system 100 includes a tandem type master cylinder M, a hydraulic booster 113 which regulates the hydraulic pressure in a hydraulic pressure generation source 112 in accordance with brake effort inputted from a brake pedal 111 which is a brake control member for application to the master cylinder M, and a stroke simulator 114 which is interposed between the brake pedal 111 and the hydraulic booster 113.

A cylinder body 116 of the master cylinder M is formed into a bottomed cylindrical shape which is closed at a front end thereof, and a rear end of the cylinder body 116 is connected to a front end of a casing 117 that the hydraulic booster 113 includes. The rear end of the cylinder body 16 is fitted in a front portion of the casing 117 fluidly tightly. A separator 18, a first sleeve 119 and a second sleeve 120 which are fitted in the casing 117 fluidly tightly are held between the rear end of the cylinder body 116 and the casing 117 with the first sleeve 119 held between the separator 118 and the second sleeve 120.

A first cylinder bore 121 is formed in the cylinder body 116, and the first cylinder bore 121 is closed at a front end thereof. The master cylinder M is made up of a rear master piston 123 and a front master piston 124. The rear master piston 123 faces a booster hydraulic chamber 122 on the back thereof and is biased rearwards by a spring. The rear master piston 123 is slidably fitted in the first cylinder bore 121. The front master piston 124 is disposed in front of the rear master piston 123 while being biased rearwards by a spring and is slidably fitted in the first cylinder bore 121. A rear output hydraulic chamber 125 is formed between the rear master piston 123 and the front master piston 124, and a front output hydraulic chamber 126 is formed between a front end closed portion of the cylinder body 116 and the front master piston 124.

A rear output port 127 and a front output port 128 are provided in the cylinder body 116. The rear output port 127 communicates with a rear output hydraulic chamber 125, and the front output port 128 communicates with a front output hydraulic chamber 126. Further, a rear return spring 129 is provided within the rear output hydraulic chamber 125 between the rear master piston 123 and the front master piston 124 in a compressed state, the rear return spring 129 being adapted to bias the rear master pin 123 to the rear. In addition, a front return spring 130 is provided within the front output hydraulic chamber 126 between the front closed end of the cylinder body 116 and the front master piston 124 in a compressed state, the front return spring 130 being adapted to bias the front master piston 124 to the rear.

A reservoir 131 is attached to the master cylinder M. A first, second and third fluid reserving chambers 131a, 131b, 131c are formed in the reservoir 131 so as to be divided independently from each other. A rear connecting cylindrical portion 132 having a cylindrical shape and a front connecting cylindrical portion 133 having a cylindrical shape are provided integrally on the master cylinder M so as to project upwards in positions which are spaced apart from each other in an axial direction. The rear connecting cylindrical portion 132 communicates with the second fluid reserving chamber 131b, and the front connecting cylindrical portion communicates with the first fluid reserving chamber 131a.

A center valve 134 is mounted on the rear master piston 123 so as to cause the rear output hydraulic chamber 125 to communicate with the second fluid reserving chamber 131b when the rear master piston 123 returns to a withdrawal limit position. A center valve 135 is mounted on the front master piston 124 so as to cause the front output hydraulic chamber 126 to communicate with the first fluid reserving chamber 131a when the front master piston 124 returns to a withdrawal limit position.

The rear output port 127 of the master cylinder M is connected to a right front wheel brake B1 and a left rear wheel brake B2 via a hydraulic modulator 136. The front output port 128 is connected to a left front wheel brake B3 and a right rear wheel brake B4 via the hydraulic modulator 136. Thus, the hydraulic modulator 136 is a conventionally known hydraulic modulator which can execute an automatic brake control such as an anti-lock brake control executed when the brakes are applied and a traction control executed when the brakes are not applied by controlling freely a brake pressure which is outputted from the rear and front output ports 127, 128.

The hydraulic booster 113 includes a cylindrical backup piston 138, a pressure regulator valve device 139 which is incorporated in the backup piston 138, a control piston 141, a first reaction piston 142, and a second reaction piston 143. The backup piston 138 faces the booster hydraulic chamber 122 at a front end thereof so as to push directly the rear master piston 123 of the master cylinder M from the rear thereof. The backup piston 138 is slidably fitted in the separator 118 and the second sleeve 120. The control piston 141 actuates the pressure regulator valve device 139 so as to regulate the pressure by balancing a reaction force based on the hydraulic pressure in a booster hydraulic pressure generating chamber 140 which is connected to the booster hydraulic chamber 122 with a brake application input which is inputted from the brake pedal 111. The first reaction piston 142 is interposed between the pressure regulator valve device 139 and the control piston 141 so as to add a reaction force based on the hydraulic pressure in the booster hydraulic pressure generation chamber 140 to the control piston 141. The second reaction piston 143 is interposed between the backup piston 138 and the first reaction piston 142 so as to apply an output hydraulic pressure of the hydraulic pressure generation source 112 and a reaction force by a reaction spring 144 in addition to a reaction force from the first reaction piston 142 to the control piston 141 when the brake application input by the brake pedal 111 is increased.

A connecting fluid path 145 which communicates with the booster hydraulic chamber 122, an input port 146 which is connected to the hydraulic pressure generation source 112, an output fluid path 147 which communicates with the hydraulic pressure generation chamber 140, and a release port 148 which communicates with the release chamber 149 which is formed within the casing 117 at the rear of the second sleeve 120 are provided sequentially in that order from the front so as to be spaced apart from each other.

The hydraulic pressure generation source 112 is connected to the input port 146. This hydraulic pressure generation source 112 includes a pump 151 which pumps up a working fluid from the third fluid reserving chamber 131c of the reservoir 131, and an accumulator which is connected to a discharge side of the pump 151. The operation of the pump 151 is controlled in accordance with the hydraulic pressure of the accumulator 152 which is detected by a hydraulic pressure sensor 53 within the casing 17, and a high constant hydraulic pressure is supplied to the input port 146 from the hydraulic pressure generation source 112. In addition, the release port 148 is connected to the third fluid reserving chamber 131c of the reservoir 131.

The pressure regulator valve device 139 is made up of a pressure increasing valve which is interposed between the input port 146 and the booster hydraulic pressure generation chamber 140 and a pressure reducing valve which is interposed between the booster hydraulic pressure generation chamber 140 and the release chamber 149. Thus, a booster hydraulic pressure which is obtained by regulating the hydraulic pressure in the hydraulic pressure generation source 112 is generated in the booster hydraulic pressure generation chamber 140 by opening or closing the pressure increasing valve in response to the depression of the brake pedal 111.

In the hydraulic booster 113 configured as has been described above, brake application input is inputted from the brake pedal 111 to the control piston 141 via the stroke simulator 114, whereby a forward pressure is applied to the first reaction piston 142 from the control piston 141. Thus, in such a state that a forward traveling amount of the control piston 141 relative to the backup piston 138 is less than a predetermined value, only the first reaction piston 142 is in abutment with the control piston 141. The pressure reducing valve of the pressure regulator valve device 139 is closed as the first reaction piston 142 advances, whereby a communication between the booster hydraulic pressure generation chamber 140 and the release chamber 149 is cut off When the control piston 141 and the first reaction piston 142 advance further, the pressure increasing valve of the pressure regulator valve device 139 is opened.

The hydraulic pressure of the booster hydraulic pressure generation chamber 140 is applied to a front end of the first reaction piston 142 with the pressure reducing valve closed. When the first reaction piston 142 and the control piston 141 withdraw so that the brake application input from the brake pedal 111 is balanced with the hydraulic pressure based on the hydraulic pressure in the booster hydraulic pressure generation chamber 140, the pressure reducing valve is opened and the pressure increasing valve is closed. By repeating the opening and closing of the pressure increasing valve and the pressure reducing valve, the output hydraulic pressure of the hydraulic pressure generation source 112 is regulated to a booster hydraulic pressure which corresponds to the brake application input from the brake pedal 111 for application to the booster hydraulic pressure generation chamber 140. In addition, when the forward traveling amount of the control piston 141 relative to the backup piston 138 reaches and exceeds the predetermined value, not only the first reaction piston 142 but also the second reaction piston 143 are brought into abutment with the control piston 141, whereby not only a hydraulic pressure which pushes the second reaction piston 143 to the rear by virtue of the hydraulic pressure from the hydraulic pressure generation source 112 but also the spring force of the reaction spring 144 are added as a reaction force, this increasing the reaction force acting on the control piston 141.

The connecting fluid path 145, which is provided in the casing 117 so as to communicate with the booster hydraulic chamber 122, is connected to the hydraulic pressure generation source 112 via an automatic brake pressure applying electromagnetic valve 154 which is a normally closed linear solenoid valve and is connected to the third fluid reserving chamber 131c of the reservoir 131 via a regeneration cooperative pressure reducing electromagnetic valve 155 which is a normally closed linear solenoid valve. Namely, the normally closed automatic brake pressure applying electromagnetic valve 154 is interposed between the booster hydraulic chamber 122 and the hydraulic pressure generation source 112, and the normally closed regeneration cooperative pressure reducing electromagnetic valve 155 is interposed between the booster hydraulic chamber 122 and the reservoir 131.

In addition, the output fluid path 147, which communicates with the booster hydraulic pressure generation chamber 140, is connected to the connecting fluid path 145 via an automatic brake pressure reducing electromagnetic valve 156 and a regeneration cooperative pressure applying electromagnetic valve 157 which are connected in series. Both the automatic brake pressure reducing electromagnetic valve 256 and the regeneration cooperative pressure applying electromagnetic valve 157 are a normally open linear solenoid valve.

A first one-way valve 158 is connected in parallel to the automatic brake pressure reducing electromagnetic valve 156, and this first one-way valve 158 permits a flow of working fluid from the output fluid path 147 to the connecting fluid path 145. In addition, a second one-way valve 159 is connected in parallel to the regeneration cooperative pressure applying electromagnetic valve 157, and this second one-way valve 159 permits a flow of working fluid from the connecting fluid path to the output fluid path 147.

Namely, the automatic brake pressure reducing electromagnetic valve 156, to which the first one-way valve 158 is connected in parallel, and the regeneration cooperative pressure applying electromagnetic valve 159, to which the second one-way valve 159 is connected in parallel, are interposed between the booster hydraulic pressure generation chamber 140 and the booster hydraulic chamber 122.

Moreover, a brake application amount detecting hydraulic sensor 160 is connected between the output fluid path 147 and the automatic brake pressure reducing electromagnetic valve 156. An automatic brake feedback controlling hydraulic sensor 161 is connected between the regeneration cooperative pressure applying electromagnetic valve 157 and the connecting fluid path 145.

In this way, the automatic brake pressure applying electromagnetic valve 154 is interposed between the hydraulic pressure generation source 112 and the booster hydraulic chamber 122. The automatic brake pressure reducing electromagnetic valve 156 and the first one-way valve 158, which is connected in parallel to the automatic brake pressure reducing valve 156 so as to permit the flow of brake fluid from the booster hydraulic pressure generation chamber 140 to the booster hydraulic chamber 122, are interposed between the booster hydraulic pressure generation chamber 140 and the booster hydraulic chamber 122. Thus, when the brake pedal 111 is not depressed, that is, when the pressure regulator valve device 139 is not operated, too, by controlling the automatic brake pressure applying electromagnetic vale 154 and the automatic brake pressure reducing electromagnet valve 156 to be opened or closed so as to regulate the hydraulic pressure of the booster hydraulic chamber 122, an automatic brake control can be performed in which with no brakes applied, brake hydraulic pressures are caused to be applied to the wheel brakes B1 to B4. Moreover, when the pressure regulator valve 139 is actuated to generate a higher hydraulic pressure than the hydraulic pressure in the booster hydraulic chamber 112 in the booster hydraulic pressure generation chamber 140 by depressing the brake pedal 111 with the automatic brake pressure reducing electromagnetic valve 156 closed while an automatic brake is applied, the hydraulic pressure in the booster hydraulic pressure generation chamber 140 can be caused to be applied to the booster hydraulic chamber 122 via the first one-way valve 158, whereby the master cylinder M can be actuated likewise the normal brake application.

In addition, the regeneration operative pressure reducing electromagnetic valve 155 is interposed between the booster hydraulic chamber 122 and the reservoir 131, and the regeneration cooperative pressure applying electromagnetic valve 157 and the second one-way valve 159, which is connected in parallel to the regeneration cooperative pressure applying electromagnetic valve 157 so as to permit the flow of brake fluid from the booster hydraulic chamber 122 to the booster hydraulic pressure generation chamber 140, are interposed between the booster hydraulic pressure generation chamber 140 and the booster hydraulic chamber 122. Therefore, by controlling the regeneration cooperative pressure applying electromagnetic valve 157 and the regeneration cooperative pressure reducing electromagnetic valve 155 to be opened and closed so as to regulate the hydraulic pressure in the booster hydraulic chamber 122 during regeneration with the brakes applied, a brake hydraulic pressure which is offset from the normal brake application can be outputted from the master cylinder M. When the brake pedal 111 is released with the regeneration cooperative pressure applying electromagnetic valve 157 closed, the hydraulic pressure in the booster hydraulic chamber 122 can be relieved to the reservoir 131 via the second one-way valve 159.

The stroke simulator 114 includes an input piston 162 which is fitted in the control piston 141 fluidly tightly and slidably in an axial direction and a spring device 163 which is interposed between the input piston 162 and the control piston 141 and is incorporated in the control piston 141.

An input rod 64 which is connected to the brake pedal 111 is connected to the input piston 162 at a front end portion thereof so as to move from side to side. Namely, brake effort according to the depression of the brake pedal 111 is inputted into the input piston 162 via the input rod 164, and the input piston 162 operates to advance in accordance with the inputted brake effort.

The spring device 163 includes an elastic member 165 which is formed into a cylindrical shape using an elastic material such as a rubber and a metallic coil spring 166 of which a spring load is set smaller than the elastic member 165. The elastic member 165 and the coil spring 166 are interposed in series between the input piston 162 and the control piston 141 so that a spring force exhibited by the coil spring 166 is applied to the control piston 141 in an initial stage of depression of the brake pedal 111 and the elastic member 165 starts to be elastically deformed after the application of the spring force of the coil spring 166 to the control piston 141 is completed.

A rear end portion of a boots 167 which covers a projecting portion from the casing 117 of the control piston 141 is mounted on the input rod 64, and a front end portion of the boots 167 is mounted on a rear end portion of the casing 117.

In the brake system 100 configured as has been described heretofore, the ECU 5 controls the automatic brake pressure applying electromagnetic valve 154 and the automatic brake pressure reducing electromagnetic valve 156 to be opened and closed and also controls the regeneration cooperative pressure reducing electromagnetic valve 155 and the regeneration cooperative pressure applying electromagnetic valve 157 to be opened and closed. By this control, even when no brakes are applied with the brake pedal 111 not depressed by the driver, not only can an automatic brake control be executed in which brake hydraulic pressures are applied to the wheel brakes B1 to B4, but also a so-called regeneration cooperative control can be executed in which a brake torque is made to work in the brake system 100 which is obtained by subtracting a regenerative brake torque from a target brake torque based on the regenerative brake torque which varies in accordance with an amount of electricity generated by the motor 7.

Figure 8:
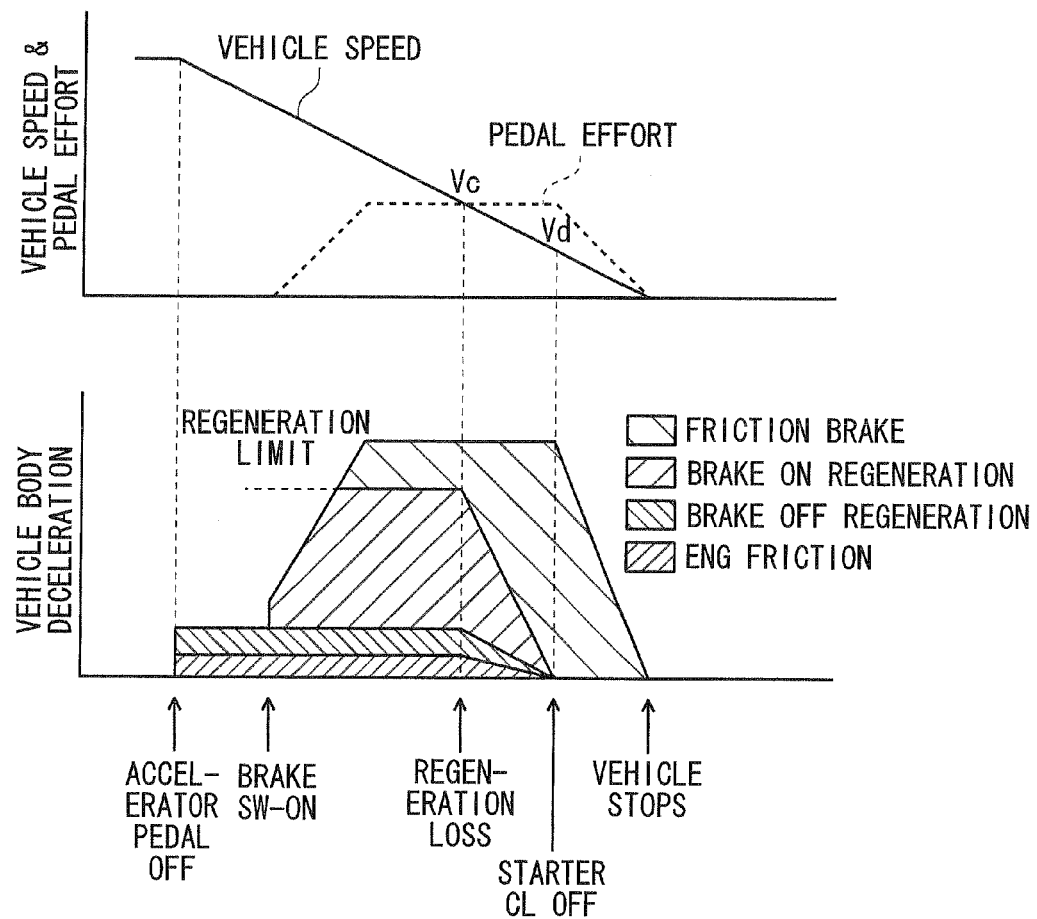
FIG. 8 is a graph showing a distribution of braking force when the vehicle is stopped by the driver who depresses a brake pedal while the vehicle is running on an engine.

FIG. 8 shows a distribution of braking force in the brake system 100 when the driver stops the vehicle running on the engine by depressing the brake pedal. In this brake system 100, engine braking is attained by engine friction and a braking force is generated as a result of executing a predetermined amount of brake OFF regeneration in the motor 7 at a point in time when the driver releases an accelerator pedal (not shown). Then, when the driver depresses the brake pedal 111, a regenerative brake (brake ON regeneration) corresponding to a regeneration limit calculated by the ECU 5 is applied in the motor 7. This generates a braking force, and in case the braking force generated by the brake ON regeneration is insufficient to meet a target brake torque, the insufficient braking force is compensated for by a friction braking force generated by the wheel brakes B1 to B4 of the brake system 100. Then, when the vehicle is slowed down to a predetermined vehicle speed Vc, the regenerative braking amount by the motor 7 is reduced, while the frictional braking amount by the wheel brakes B1 to B4 of the brake system 100 is increased. When the vehicle is slowed down further to a predetermined vehicle speed Vd, the first and second clutches 41, 42 (starter clutches) are disengaged to thereby stop the regeneration. Finally, the vehicle is stopped by frictional braking effect produced by the wheel brakes B1 to B4 of the brake system 100.

Thus, as has been described heretofore, according to the vehicle driving system of the embodiment, the regeneration amount can be increased in accordance with the pedal effort applied to the brake pedal 111. Then, the hydraulic pressure of the master cylinder M is controlled for the first time after the regeneration amount reaches the regeneration limit so as to ensure the braking force by the brakes. Therefore, the vehicle can be slowed down by making full use of the regeneration of the motor 7.

Following this, a regeneration control during EV running will be described.

Figure 9:
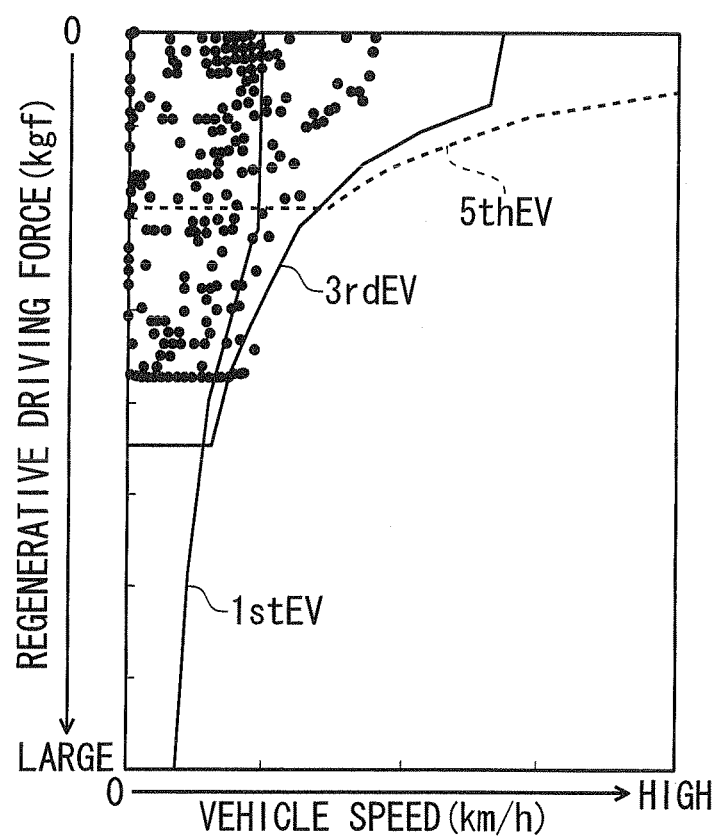
FIG. 9 is a graph showing a relation between vehicle driving points and regeneration possible regions in respective EV modes.

As shown in FIG. 9, a regeneration possible region in the $5^{th}$ EV mode is situated in a low torque, high revolution speed region. A regeneration possible region in the $3^{rd}$ EV mode is situated in a high torque, low revolution speed region. A regeneration possible region in the $1^{st}$ EV mode is situated in a high torque, low revolution speed region. Consequently, when the vehicle comes to a standstill after the vehicle has run at high speeds in the $5^{th}$ EV mode, in the $5^{th}$ EV mode, the regenerative generation cannot be executed by the motor 7 after the vehicle has been slowed down to the predetermined vehicle speed, resulting in a state in which electricity generation cannot be executed by the motor 7 by making effective use of regenerative energy.

Figure 10:
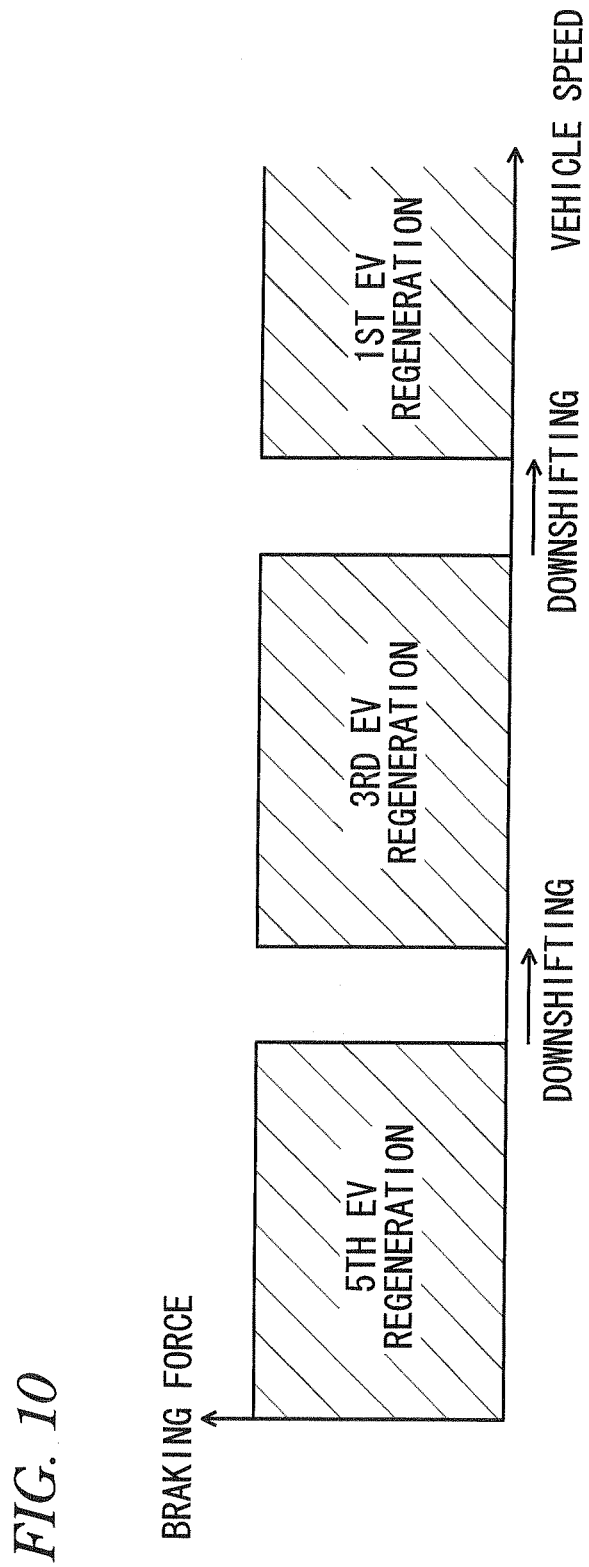
FIG. 10 is a graph showing a relation between braking force and vehicle speed when downshifting is carried out in accordance with the deceleration of the vehicle during EV running.

Then, it is considered to slow down the vehicle with the braking force produced by the wheel brakes B1 to B4 of the brake system 100 in regions out of the regeneration possible region in the $5^{th}$ EV mode. However, in this case, the braking energy cannot be made effective use of. Further, when reaccelerating the vehicle, the vehicle is reaccelerated in the $5^{th}$ EV mode, and therefore, a required driving torque cannot be obtained, and the vehicle is slow to be accelerated. On the other hand, it is considered to downshift the transmission from the $5^{th}$ EV mode to the $3^{rd}$ EV mode and to the $1^{st}$ EV mode. When downshifting from the $5^{th}$ EV mode to the $3^{rd}$ EV mode, a zero torque control of the motor 7 needs to be executed while the first change-speed shifter 51, which is now engaged in the fifth speed connecting position, is engaged in the third speed connecting position. Further, when downshifting from the $3^{rd}$ EV mode to the $1^{st}$ EV mode, the zero torque control of the motor 7 needs to be executed while the first change-speed shifter 51, which is now engaged in the third speed connecting position, is shifted into the neutral position and the lock mechanism 61 is put in the LOCK ON state from the LOCK OFF state. However, as shown in FIG. 10, this downshifting has a problem that the braking force of the vehicle cannot be ensured during the zero torque control of the motor 7.

Then, in the vehicle driving system 1 of the embodiment, in downshifting from the $5^{th}$ EV mode to the $3^{rd}$ EV mode, the aforesaid automatic brake control is executed in which the loss of braking force occurring while the first change-speed shifter 51, which is now engaged in the fifth speed connecting position, is engaged in the third speed connecting position is compensated for by the braking force by the wheel brakes B1 to B4 of the brake system 100.

Figure 11:
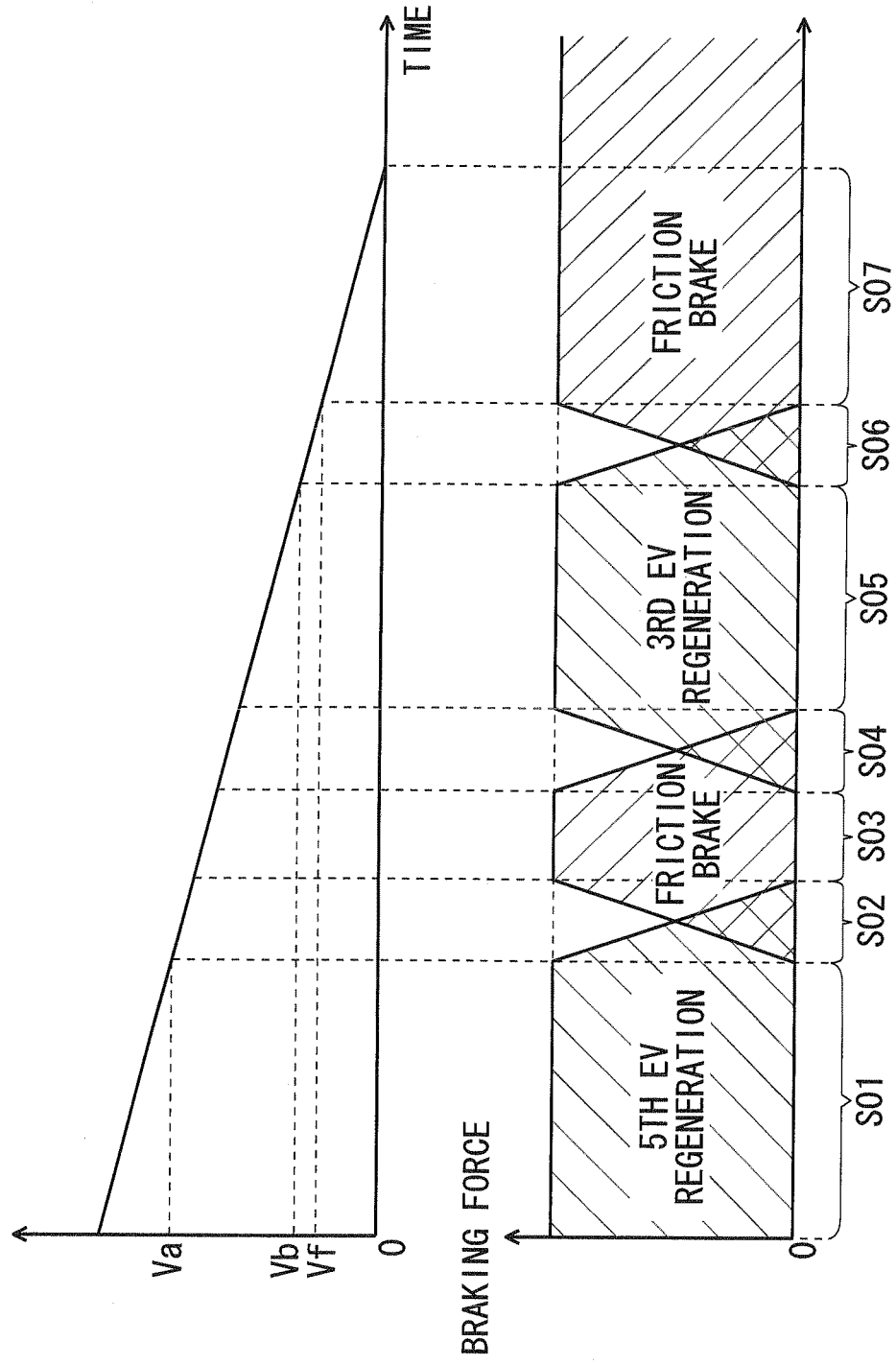
FIG. 11 is a graph showing a relation between braking force and vehicle speed when wheel brakes are actuated in a cooperative fashion during downshifting carried out in accordance with the deceleration of the vehicle during EV running.
Figure 12:
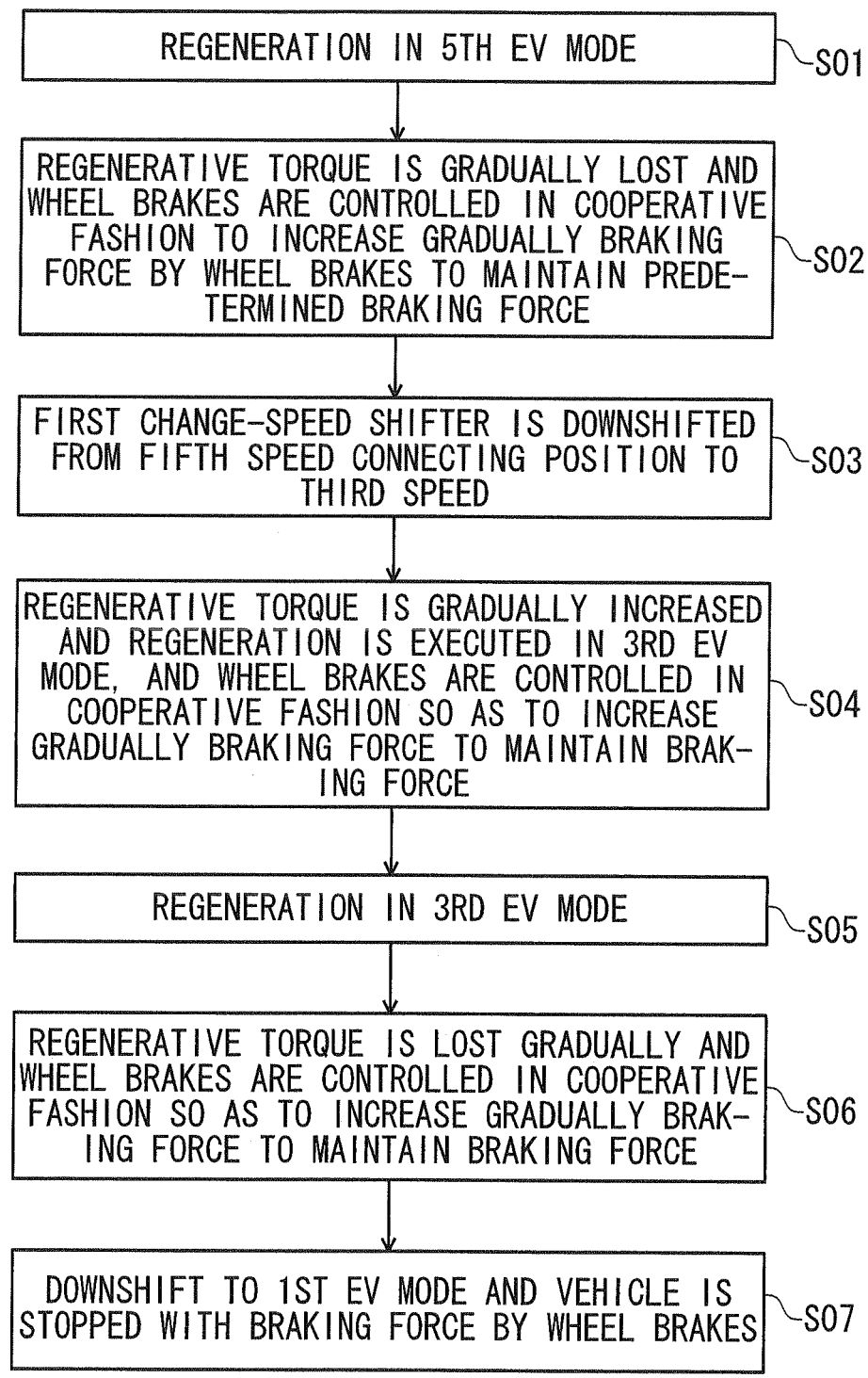
FIG. 12 is a control flowchart of decelerating the vehicle during EV running.

To describe this gear change control by reference to FIGS. 11 and 12, regeneration is executed in the $5^{th}$ EV mode with the accelerator pedal released or OFF (S01). Then, the regenerative torque of the motor 7 is gradually lost, while the wheel brakes B1 to B4 of the brake system 100 are actuated so as to increase gradually the braking force so as to maintain a predetermined braking force, when the vehicle speed is slowed down to Va (S02). Then, in such a state that the regenerative torque is lost completely (in such a state that the braking force is ensured only by the friction brake), downshifting is executed by engaging the first change-speed shifter 51, which is now engaged in the fifth speed connecting position, in the third speed connecting position (S03). Following this, the regeneration is executed in the $3^{rd}$ EV mode while increasing gradually the regenerative torque of the motor 7, and at the same time, the wheel brakes B1 to B4 of the brake system 100 are operated so as to reduce gradually the braking force so as to maintain the predetermined braking force (S04). The wheel brakes B1 to B4 of the brake system 100 are released so as to cut off the braking force and the regeneration is executed in the $3^{rd}$ EV mode after the braking force of the motor 7 reaches a predetermined braking force in the $3^{rd}$ EV mode (S05). Further, when the vehicle speed is slowed down to Vb, the regenerative torque of the motor 7 is gradually lost, while the wheel brakes B1 to B4 of the brake system 100 are actuated to increase gradually the braking force so as to maintain the predetermined braking force (S06). When slowing down the vehicle which is slowed down to a vehicle speed Vf or slower, a required braking force is not available from the regeneration even in the event that the transmission is downshifted to the $1^{st}$ EV mode. Therefore, the vehicle is stopped by the braking force of the wheel brakes B1 to B4 of the brake system 100 (S07). During this time, the first change-speed shifter 51, which is engaged in the third speed connecting position, is shifted to the neutral position, and the lock mechanism 61 is put in the LOCK ON state from the LOCK OFF state, whereby the vehicle is now shifted into the $1^{st}$ EV mode so as to be ready for reacceleration.

According to the vehicle driving system 1 of this embodiment that has been described heretofore, when the vehicle is decelerated while running on the $5^{th}$ EV mode by selecting the fifth speed drive gear 25a, the wheel brakes B1 to B4 of the brake system 100 are operated in a cooperative fashion so as to compensate for a reduction in regenerative braking force of the motor 7 while downshifting is executed from the fifth speed drive gear 25a to the third speed drive gear 23a by the first change-speed shifter 51 with regeneration executed by the motor 7, that is, while downshifting is executed from the $5^{th}$ EV mode to the $3^{rd}$ EV mode with regeneration executed by the motor 7, thereby making it possible to ensure the braking force during downshifting. Consequently, energy which is conventionally discharged as thermal energy while the braking force is generated by the wheel brakes can be made effective use of as regenerative energy. In addition, the vehicle is slowed down in accordance with the vehicle speed, and therefore, when reaccelerating the vehicle, the vehicle can be reaccelerated smoothly.

In addition, when the required regeneration cannot be obtained after the regeneration is executed on the third speed drive gear 23a, downshifting is executed from the $3^{rd}$ EV mode to the $1^{st}$ EV mode so as to be ready for reacceleration, thereby making it possible to reaccelerate the vehicle smoothly when it is reaccelerated.

Additionally, in place of the wheel brakes B1 to B4 of the brake system 100 being controlled so as to compensate for the loss of braking force which occurs during downshifting with regeneration executed, the loss of braking force may be prevented by making use of engine braking effects.

Figure 13:
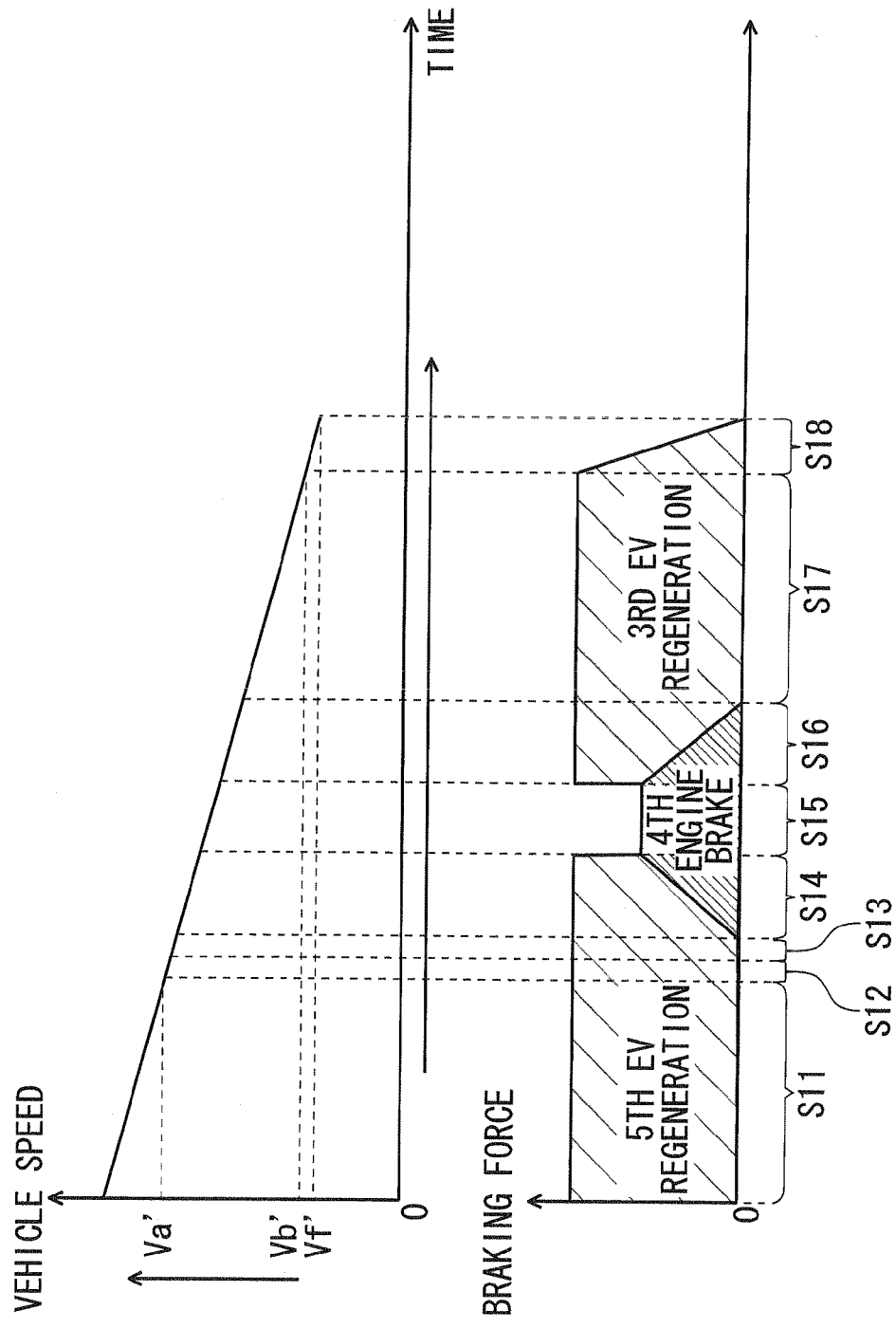
FIG. 13 is a graph showing a relation between braking force and vehicle speed when engine braking is used during downshifting executed in accordance with the deceleration of the vehicle during EV running.
Figure 14:
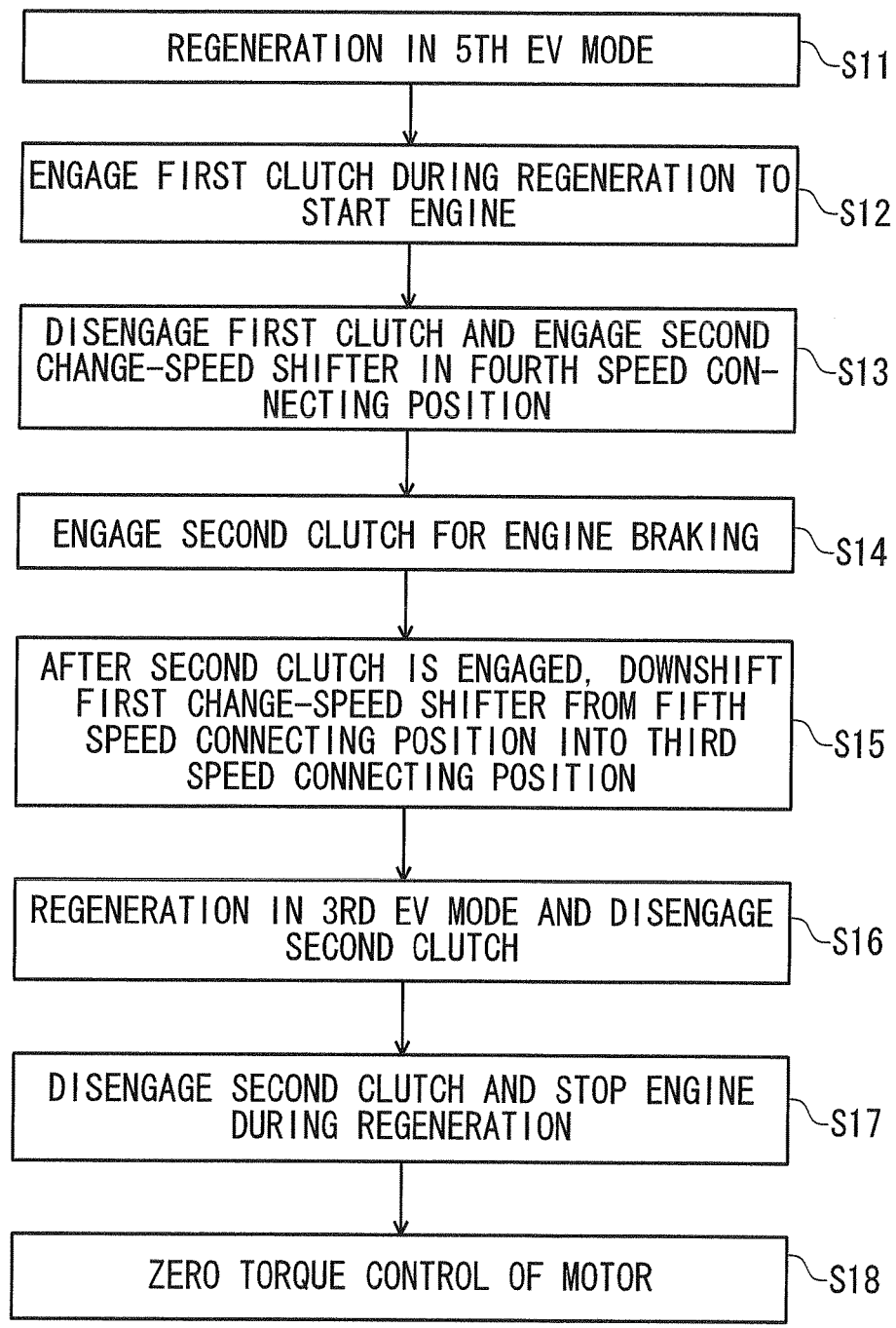
FIG. 14 is a control flowchart of the downshifting using engine braking effects shown in FIG. 13.
Figure 15:
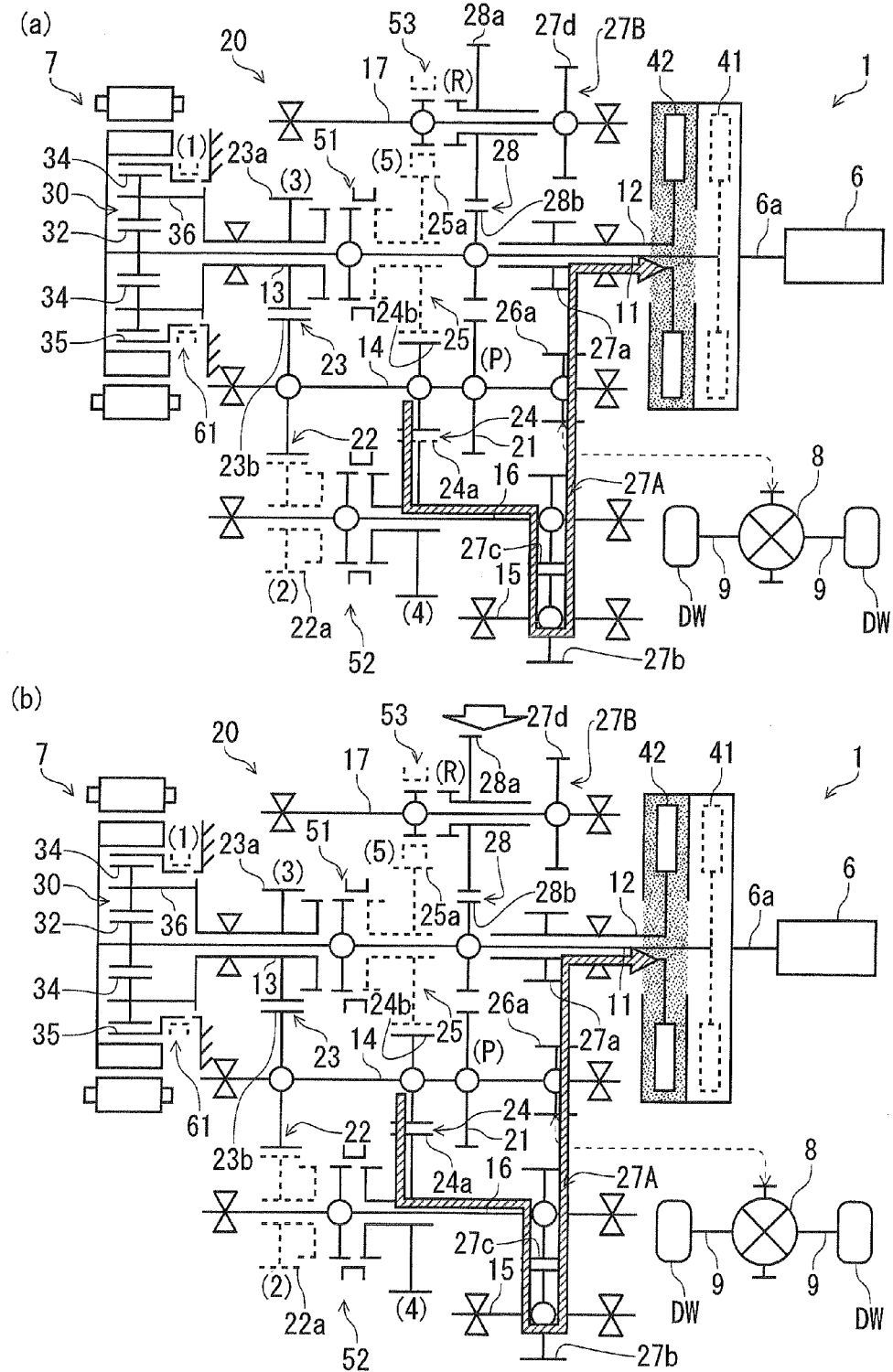
FIG. 15 shows diagrams showing torque transmitting conditions of the vehicle driving system when engine braking is used during downshifting from 5$^{th}$ EV mode to 3$^{rd}$ EV mode, of which (a) shows a state in which the downshifting is made in a fifth speed connecting position, and (b) shows a state in which the downshifting is made in a third speed connecting position.

Referring to FIGS. 13 and 14, this gear change control will be described specifically. Regeneration is executed in the $5^{th}$ EV mode in such a state that the accelerator pedal, not shown, is released or OFF during EV running on the $5^{th}$ EV mode (S11). Then, when the vehicle speed is lowered to Va', the first clutch 41 is engaged so as to start the engine 6 while regeneration is executed (S12). After the engine 6 has been started, the first clutch 41 is disengaged, and the second change-speed shifter 52 is shifted from a neutral position to be engaged in a fourth speed connecting position (S13). In this state, the first and second clutches 41, 42 are released, and therefore, the engine 6 is disengaged. Then, the second clutch 42 is gradually engaged to attain engine braking while reducing the regeneration amount so as to maintain the braking force (S14). FIG. 14(a) shows a state in which engine braking is attained in such a state that the first clutch 41 is disengaged while the second clutch 42 is engaged and the second change-speed shifter 52 is engaged in the fourth speed connecting position with the first change-speed shifter 51 left engaged in the fifth speed connecting position. Then, after the second clutch 42 is engaged completely, the first change-speed shifter 51, which is now engaged in the fifth speed connecting position, is engaged (pre-shifted) in the third speed connecting position to thereby execute downshifting (S15). FIG. 11(b) shows a state in which the first change-speed shifter 51 is engaged in the third speed connecting position from the fifth speed connecting position from the state shown in FIG. 11(a). Following this, the second clutch 42, which is now engaged, is gradually disengaged while increasing the regeneration amount in the $3^{rd}$ EV mode so as to maintain the braking force (S16). Then, after the second clutch 42 is completely disengaged, the engine 6 is stopped, and the regeneration continues in the $3^{rd}$ EV mode (S17). When the vehicle speed is lowered further to Vb', the regenerative torque of the motor 7 is gradually lost so as to execute the zero torque control (S 18). A vehicle speed Vf' is a vehicle speed at which the required regeneration cannot be obtained in the $3^{rd}$ EV mode. As to the braking at a vehicle speed Vf or slower, the required braking force cannot be obtained from regeneration even in the event that the vehicle is slowed down to the $1^{st}$ EV mode. Therefore, the vehicle is stopped with a braking force of a mechanical brake 105, which will be described later, as required by the intention of the driver. During this time, the first change-speed shifter 51, which is engaged in the third speed connecting position, is shifted to the neutral position, and the lock mechanism 61 is put in the LOCK ON state from the LOCK OFF state, whereby downshifting is executed to $1^{st}$ EV mode so as to be ready for reacceleration.

Figure 16:
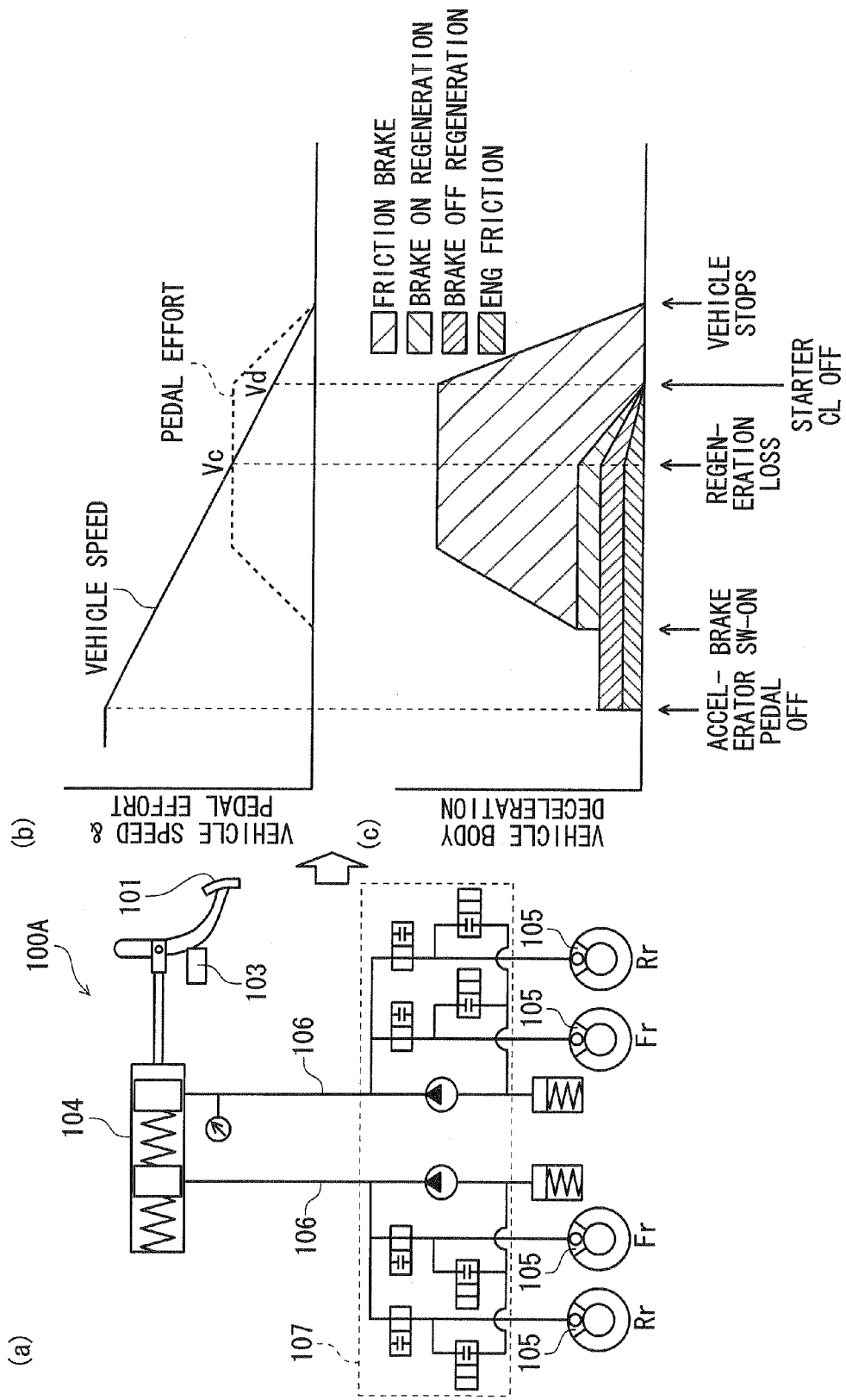
FIG. 16(a) is an exemplary diagram showing another example of a brake system.
FIG. 16(b) is a graph showing a relation between vehicle speed and pedal effort.
FIG. 16(c) is a graph showing a distribution of braking force.

A brake system 100A shown in FIG. 16 may be used for the gear change described above.

As shown in FIG. 16(a), the brake system 100A includes a brake pedal 101, a brake switch 103 which detects a depression of the brake pedal 101, a tandem type master cylinder 104 which applies a braking hydraulic pressure in accordance with a brake application amount inputted from the brake pedal 101, the mechanical brake 105, and a brake line 106 along which the hydraulic pressure of the master cylinder 104 is supplied to the mechanical brake 105. The mechanical brake 105 is made up of a known mechanical brake which is controlled by a hydraulic pressure of a disk brake or a drum brake. An ABS mechanism 107 is provided on the brake line 106 which prevents respective road wheels from being locked when brakes are applied.

In the brake system 100A, when stopping the vehicle which runs on engine, as shown in FIGS. 16(b) and 16(c), engine braking is attained by engine friction and a braking force is generated as a result of executing a predetermined amount of brake OFF regeneration in the motor 7 at a point in time when the driver releases the accelerator pedal 101. Then, when the driver depresses the brake pedal 101, the brake switch 103 detects the depression of the brake pedal 101, and a predetermined amount of brake ON regeneration, which is determined in advance, is executed in the motor 7 to generate a braking force, and a braking hydraulic pressure corresponding to the depression amount of the brake pedal 101 is supplied to the mechanical brake 105, whereby the mechanical brake 105 is actuated. Then, when the vehicle is slowed down to reach the predetermined vehicle speed Vc, the regenerative torque of the motor 7 is gradually lost. When the vehicle is slowed down further to the predetermined vehicle speed Vd, the first and second clutches 41, 42 (starter clutches) are disengaged. Finally, the vehicle is stopped by frictional braking effect produced by the mechanical brake 105.

Figure 17:
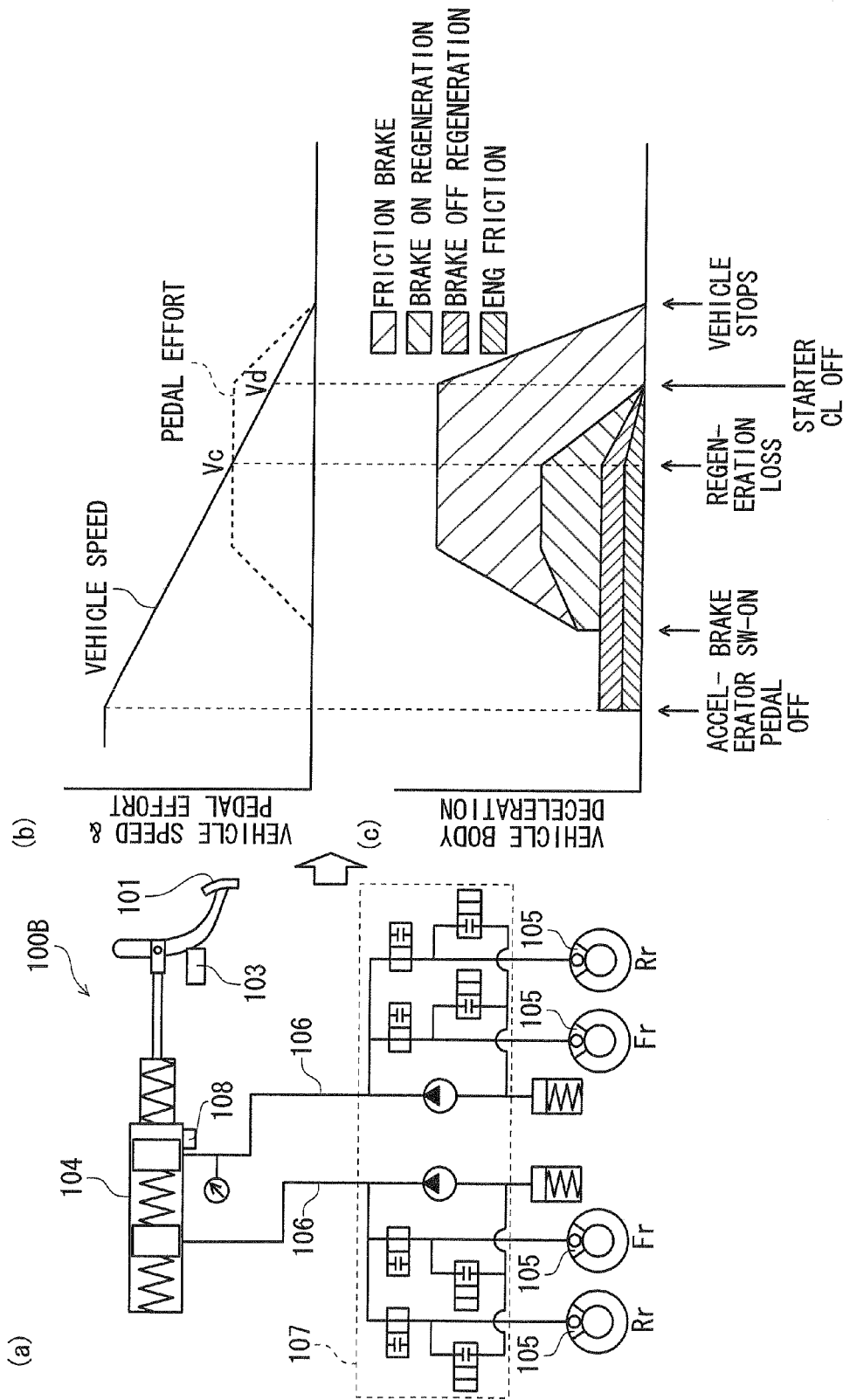
FIG. 17(a) is an exemplary diagram showing a further example of a brake system.
FIG. 17(b) is a graph showing a relation between vehicle speed and pedal effort.
FIG. 17(c) is a graph showing a distribution of braking force.

Additionally, a brake system 100B shown in FIG. 17 may be used.

As shown in FIG. 17(a), the brake system 100B includes a brake pedal 101, a brake switch 103 which detects a depression of the brake pedal 101, a tandem type master cylinder 104 which applies a braking hydraulic pressure in accordance with a brake application amount inputted from the brake pedal 101, a master cylinder pressure sensor 108 which detects a hydraulic pressure in the master cylinder 104, a mechanical brake 105, and a brake line 106 along which the hydraulic pressure of the master cylinder 104 is supplied to the mechanical brake 105. Likewise the brake system 100 that has been described before, the mechanical brake 105 is made up of a known mechanical brake which is controlled by a hydraulic pressure of a disk brake or a drum brake. An ABS mechanism 107 is provided on the brake line 106 which prevents respective road wheels from being locked when brakes are applied.

The brake system 100B is similar to the brake system 100A that has been described before in the following point. When stopping the vehicle which runs on engine, as shown in FIGS.

17(b) and 17(c), engine braking is attained by engine friction and a braking force is generated as a result of executing a predetermined amount of brake OFF regeneration in the motor 7 at a point in time when the driver releases the accelerator pedal 101, whereby the vehicle speed is reduced. However, in this brake system 100B, when the brake switch 103 detects the depression of the brake pedal 101, a predetermined amount of brake ON regeneration is executed in the motor 7 to which a predetermined regeneration amount is added in accordance with the master cylinder pressure detected by the master cylinder pressure sensor 108. In addition, a braking hydraulic pressure corresponding to the depression amount of the brake pedal 101 is supplied to the mechanical brake 105, whereby the mechanical brake 105 is actuated. Then, when the vehicle is slowed down to reach the predetermined vehicle speed Vc, the regenerative torque of the motor 7 is gradually lost. When the vehicle is slowed down further to the predetermined vehicle speed Vd, the first and second clutches 41, 42 are disengaged. Finally, the vehicle is stopped by frictional braking effect produced by the mechanical brake 105.

In this brake system 100B, the predetermined amount of brake ON regeneration is executed in the motor 7 to which the predetermined regeneration amount is added in accordance with the master cylinder pressure detected by the master cylinder pressure sensor 108. However, the invention is not limited thereto. Hence, a stroke sensor may be used in place of the master cylinder sensor 108 so as to add a predetermined regeneration amount in accordance with a stroke detected by the stroke sensor.

According to the vehicle driving system 1 of this embodiment that has been described heretofore, when the vehicle is decelerated while running on the $5^{th}$ EV mode by selecting the fifth speed drive gear 25a, the engine 6 is started, and the second clutch 42 is engaged in such a state that the four speed drive gear 24a is selected by the second change-speed shifter 52 while downshifting is executed from the fifth speed drive gear 25a to the third speed drive gear 23a by the first change-speed shifter 51 with regeneration executed by the motor 7, that is, while downshifting is executed from the $5^{th}$ EV mode to the $3^{rd}$ EV mode with regeneration executed by the motor 7, thereby making it possible to ensure the braking force during downshifting. Consequently, energy which is conventionally discharged as thermal energy while the braking force is generated by the wheel brakes can be made effective use of as regenerative energy. In addition, the vehicle is slowed down in accordance with the vehicle speed, and therefore, when reaccelerating the vehicle, the vehicle can be reaccelerated smoothly.

In addition, when the required regeneration cannot be obtained after the regeneration is executed on the third speed drive gear 23a, downshifting is executed from the $3^{rd}$ EV mode to the $1^{st}$ EV mode so as to be ready for reacceleration, thereby making it possible to reaccelerate the vehicle smoothly when it is reaccelerated.

Second Embodiment

Figure 18:
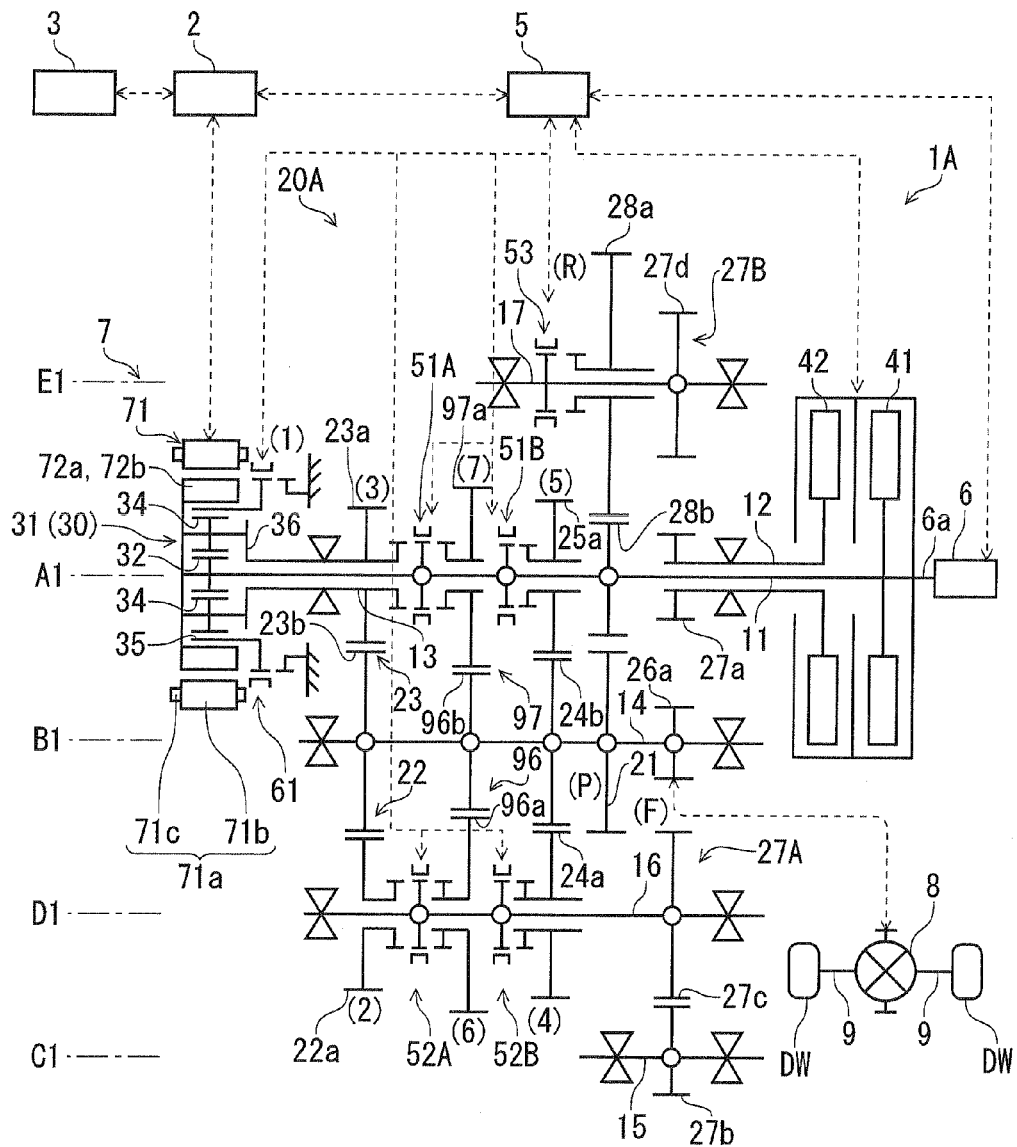
FIG. 18 is a schematic diagram showing a vehicle driving system according to a second embodiment of the invention.
Figure 19:
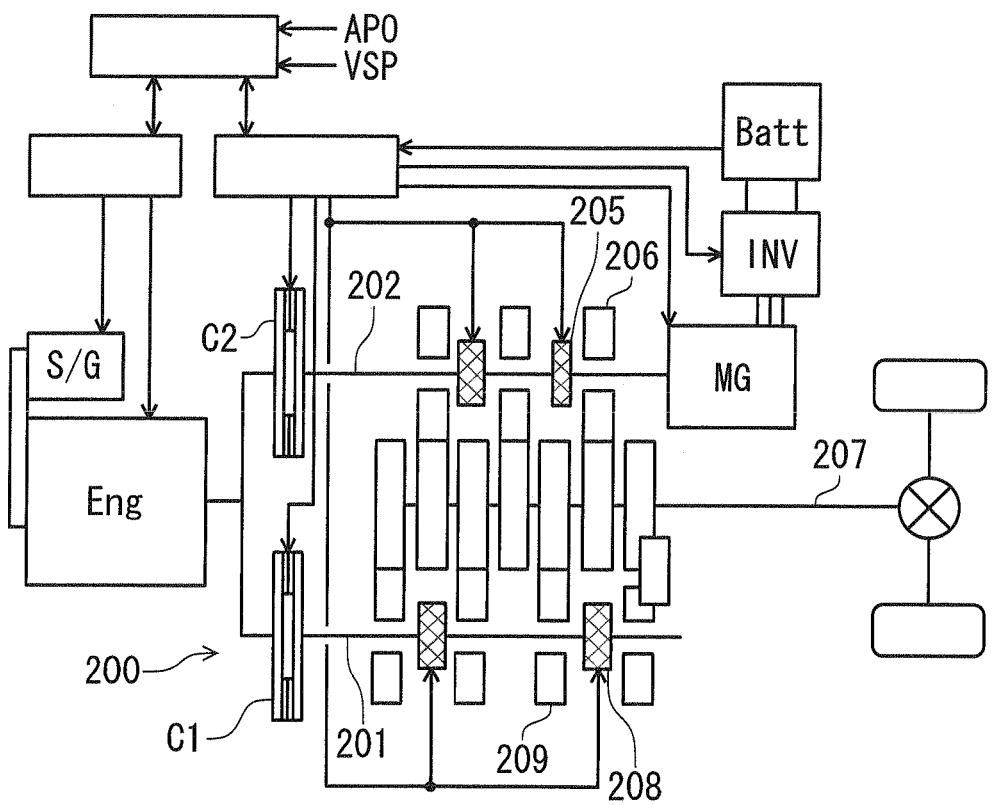
FIG. 19 is a schematic diagram of a vehicle driving system described in Patent Literature 1.

Next, a vehicle driving system according to a second embodiment will be described by reference to FIG. 18. A vehicle driving system 1A differs from the vehicle driving system 1 in that a transmission 20A includes a six speed gear pair 96 and a seventh speed gear pair 97 in addition to a planetary gear mechanism 30 and second to fifth speed gear pairs 22 to 25. Hereinafter, the vehicle driving system 1A will be described by referring only to the different feature from the vehicle driving system 1 that has been described before.

A seventh speed drive gear 97a is provided on a first main shaft 11 between a third speed drive gear 23a and a fifth speed drive gear 25a so as to rotate relative to the first main shaft 11. In addition, a first change-speed shifter 51A is provided between the third speed drive gear 23a and the seventh speed drive tear 97a, this first change-speed shifter 51A being adapted to connect the first main shaft 11 and the third speed drive gear 23a or the seventh speed drive gear 97a or release the connection. A third change-speed shifter 51B is provided between the seventh speed drive gear 97a and the fifth speed drive gear 25a, this third change-speed shifter 51B being adapted to connect the first main shaft 11 and the fifth speed drive gear 25a or release the connection. Then, when the first change-speed shifter 51A is engaged in a third speed connecting position, the first main shaft 11 and the third speed drive gear 23a are connected together to rotate together. When the first change-speed shifter 51A is engaged in a seventh speed connecting position, the first main shaft 11 and the seventh speed drive gear 97a rotate together. When the first change-speed shifter 51A is in a neutral position, the first main shaft 11 rotates relative to the third speed drive gear 23a and the seventh speed drive gear 97a. Additionally, when the third change-speed shifter 51B is engaged in a fifth speed connecting position, the first main shaft 11 and the fifth speed drive gear 25a are connected together to rotate together. When the third change-speed shifter 51B is in a neutral position, the first main shaft 11 rotates relative to the fifth speed drive gear 25a.

A sixth speed drive gear 96a is provided on a second intermediate shaft 16 between a second speed drive gear 22a and a fourth speed drive gear 24a so as to rotate relative to the second intermediate shaft 16. Additionally, a second change-speed shifter 52A is provided between the second speed drive gear 22a and the sixth speed drive gear 96a, this second change-speed shifter 52A being adapted to connect the second intermediate shaft 16 and the second speed drive gear 22a or the sixth speed drive gear 96a together or release the connection. A fourth change-speed shifter 52B is provided between the sixth speed drive gear 96a and the fourth speed drive gear 24a, this fourth change-speed shifter 52B being adapted to connect the second intermediate shaft 16 and the fourth speed drive gear 24a together or release the connection. Then, when the second change-speed shifter 52A is engaged in a second speed connecting position, the second intermediate shaft 16 and the second speed drive gear 22a are connected together to rotate together. When the second change-speed shifter 52A is engaged in a sixth speed connecting position, the second intermediate shaft 16 and the sixth speed drive gear 96a rotate together. When the second change-speed shifter 52A is in a neutral position, the second intermediate shaft 16 rotates relative to the second speed drive gear 22a and the sixth speed drive gear 96a. Additionally, when the fourth change-speed shifter 52B is engaged in a fourth speed connecting position, the second intermediate shaft 16 and the fourth drive gear 24a are connected together to rotate together. When the fourth change-speed shifter 52B is in a neutral position, the second intermediate shaft 16 rotates relative to the fourth speed drive gear 24a.

A third common driven gear 96b is mounted integrally on a countershaft 14 between a first common driven gear 23b and a second common driven gear 24b.

Here, the third common driven gear 96b meshes with the seventh speed drive gear 97a which is provided on the main shaft 11 and makes up a seventh speed gear pair 97 together with the seventh speed drive gear 97a and meshes with the sixth speed drive gear 96a which is provided on the second intermediate shaft 16 and makes up a sixth speed gear pair 96.

A sixth speed running can be attained by engaging a second clutch 42 with the second change-speed shifter 52A engaged in the sixth speed connecting position. In addition, a seventh speed running is attained by engaging a first clutch 41 with the first change-speed shifter 51A engaged in the seventh speed connecting position. In either of the cases, the running of the vehicle can be assisted by a motor 7 or a battery can be charged by the motor 7.

In the vehicle driving system 1A that is configured as has been described heretofore, the vehicle can run on a $7^{th}$ EV mode in addition to a $1^{st}$ EV mode, a $3^{rd}$ EV mode and a $5^{th}$ EV mode.

Specifically, the $7^{th}$ EV mode is attained by shifting the first change-speed shifter 51A out of the neutral position and engaging it in the seventh speed connecting position.

When the motor 7 is driven (torque is applied thereto in a forward rotating direction) in this state, a sun gear 32 of a planetary gear mechanism 30 which is connected to a rotor 72 rotates in a forward rotating direction. As this occurs, since the first and second clutches 41, 42 are disengaged, power transmitted to the sun gear 32 is not transmitted to a crankshaft 6a of an engine 6 from the first main shaft 11, but motor torque is transmitted to drive wheels DW, DW by way of the seventh gear pair 97.

When the vehicle is slowed down which is running on the $7^{th}$ EV mode, likewise the downshifting from the $5^{th}$ EV mode to the $3^{rd}$ EV mode, a braking force may be ensured by controlling wheel brakes B1 to B4 in a cooperative fashion during downshifting from the $7^{th}$ EV mode to the $5^{th}$ EV mode.

Namely, regeneration is executed in the $7^{th}$ EV mode with an accelerator pedal, not shown, released or OFF. Then, when the vehicle speed is reduced to a predetermined value, the regenerative torque of the motor 7 is gradually lost, and at the same time, the wheel brakes B1 to B4 of the brake system 100 are actuated in a cooperative fashion so as to increase gradually the braking force to be produced thereby in order to maintain a predetermined braking force. Then, in such a state that the regenerative torque is completely lost, the first change-speed shifter 51A is returned from the seventh speed connecting position to the neutral position, while the third change-speed shifter 51B is shifted out of the neutral position to be engaged in the fifth speed connecting position. Following this, the regenerative torque of the motor 7 is increased gradually, and regeneration is executed in the $5^{th}$ EV mode. At the same time, in order to maintain the predetermined braking force, the wheel brakes B1 to B4 of the brake system 100 are controlled in the cooperative fashion so as to reduce gradually the braking force produced thereby. After the regenerative braking force of the motor 7 in the $5^{th}$ EV mode reaches a predetermined braking force, the braking force produced by the wheel brakes B1 to B4 of the brake system 100 is cut off, and the regeneration continues in the $5^{th}$ EV mode. When the vehicle speed is reduced further to the predetermined value, downshifting is executed from the $5^{th}$ EV mode to the $3^{rd}$ EV mode.

Thus, as has been described heretofore, according to the vehicle driving system 1A of this embodiment, when the vehicle is slowed down which is running on the $7^{th}$ EV mode by selecting the seventh speed drive gear 97a, the wheel brakes B1 to B4 of the brake system 100 are actuated in the cooperative fashion so as to compensate for the reduction in regenerative braking force by the motor 7 while downshifting is executed from the seventh drive gear 97a to the fifth speed drive gear 25a by use of the first change-speed shifter 51A and the third change-speed shifter 51B while regeneration is executed in the motor 7, that is, while downshifting is executed from the $7^{th}$ EV mode to the $5^{th}$ EV mode while regeneration is executed in the motor 7, thereby making it possible to ensure the braking force during downshifting.

In addition, the wheel brakes B1 to B4 of the brake system 100 are operated in the cooperative fashion so as to compensate for the reduction in regenerative braking force by the motor 7 while downshifting is executed from the $5^{th}$ EV mode to the $3^{rd}$ EV mode while regeneration is executed in the motor 7 in association with a further deceleration of the vehicle, thereby making it possible to ensure the braking force during downshifting.

Consequently, energy which is conventionally discharged as thermal energy while the braking force is generated by the wheel brakes can be made effective use of as regenerative energy.

In addition, when the vehicle is slowed down which is running on the $7^{th}$ EV mode, the braking force may be ensured by use of engine braking during downshifting from the $7^{th}$ EV mode to the $5^{th}$ EV mode.

Namely, regeneration is executed in the $7^{th}$ EV mode in such a state that the accelerator pedal, not shown, is released or OFF during EV running on the $7^{th}$ EV mode. Then, when the vehicle speed is reduced to the predetermined value, the first clutch 41 is engaged to start the engine 6 while the regeneration continues. After the engine 6 is started, the first clutch 41 is disengaged, and at the same time, the second change-speed shifter 52A is shifted out of the neutral position to be engaged in the sixth speed connecting position. Then, the second clutch 42 is gradually engaged so as to apply engine braking. Then, after the second clutch 42 is engaged completely, the first change-speed shifter 51A is shifted back into the neutral position from the seventh speed connecting position, and at the same time the third change-speed shifter 51B is shifted out of the neutral position to be engaged in the fifth speed connecting position to thereby execute downshifting. Following this, regeneration is executed in the $5^{th}$ EV mode, and the second clutch 42, which is engaged, is disengaged gradually. Then, after the second clutch 42 is disengaged completely, the engine 6 is stopped. When the vehicle speed is reduced further down to the predetermined value, downshifting is executed from the $5^{th}$ EV mode to the $3^{rd}$ EV mode.

Thus, as has been described heretofore, according to the vehicle driving system 1A of the embodiment, when the vehicle is slowed down which is running on the $7^{th}$ EV mode by selecting the seventh speed drive gear 97a, the engine 6 is started, and the second clutch 42 is engaged in such a state that the sixth speed drive gear 96a is selected by the second change-speed shifter 52A while downshifting is executed from the seventh speed drive gear 97a to the fifth speed drive gear 25a by use of the first change-speed shifter 51A and the third change-speed shifter 51B while regeneration is executed in the motor 7, that is, while downshifting is executed from the $7^{th}$ EV mode to the $5^{th}$ EV mode while regeneration is executed in the motor 7, thereby making it possible to ensure the braking force during downshifting by making use of engine braking effects.

In addition, the engine 6 is started, and the second clutch 42 is engaged in such a state that the fourth speed drive gear 24a is selected by use of the fourth change-speed shifter 52B while downshifting is executed from the $5^{th}$ EV mode to the $3^{rd}$ EV mode while regeneration is executed in the motor 7 in association with a further deceleration of the vehicle, thereby making it possible to ensure the braking force during downshifting.

Consequently, in the vehicle driving system 1A of this embodiment, too, energy which is conventionally discharged as thermal energy while the braking force is generated by the wheel brakes can be made effective use of as regenerative energy.

The invention is not limited to the embodiments that have been described heretofore but can be modified or improved as required.

This patent application is based upon Japanese Patent Application (No. 2009-231617) filed on Oct. 5, 2009 and Japanese Patent Application (No. 2009-231618) filed on Oct. 5, 2009, the contents of which are incorporated herein by reference.

DESCRIPTION OF REFERENCE NUMERALS AND CHARACTERS 1, 1A driving system; 6 engine (internal combustion engine); 6a crankshaft (internal combustion engine output shaft); 7 motor (electric motor); 9 drive shaft; 11 first main shaft (first input shaft); 12 second main shaft; 13 connecting shaft; 14 countershaft (output/input shaft); 15 first intermediate shaft; 16 second intermediate shaft (second input shaft); 20, 20A transmission; 22 second speed gear pair; 22a second speed drive gear; 23 third speed gear pair; 23a third speed drive gear; 23b first common driven gear; 24 fourth speed gear pair; 24a fourth speed drive gear; 24b second common driven gear; 25 fifth speed gear pair; 25a fifth speed drive gear; 26a final gear; 27A first idler gear train; 27B second idler gear train; 27a idler drive gear; 27b first idler driven gear; 27c second idler driven gear; 27d third idler driven gear; 30 planetary gear mechanism; 32 sun gear (first element); 35 ring gear (third element); 36 carrier (second element); 41 first clutch (first engaging and disengaging unit); 42 second clutch (second engaging and disengaging unit); 51, 51A first change-speed shifter (first changeover unit); 51B third change-speed shifter (first changeover unit); 52, 52A second change-speed shifter (second changeover unit); 52B fourth change-speed shifter (second changeover unit); 53 reverse shifter; 61 lock mechanism (first changeover unit); 96 sixth speed gear pair; 96a sixth speed drive gear; 96b third common driven gear; 97 seventh speed gear pair; 97a seventh speed drive gear; 100 brake system; 111 brake pedal; B1 to B4 wheel brake; M master cylinder.

The invention claimed is:

1. A vehicle driving system comprising an internal combustion engine and an electric motor, the system comprising:
an internal combustion engine output shaft by which power is outputted from the internal combustion engine;
a first input shaft which is disposed parallel to the internal combustion engine output shaft and which is selectively connected to the internal combustion engine output shaft by a first engaging and disengaging unit;
a second input shaft which is disposed parallel to the internal combustion engine output shaft and which is selectively connected to the internal combustion engine output shaft by a second engaging and disengaging unit;
an output/input shaft which is disposed parallel to the internal combustion engine output shaft and which outputs power to a driven portion;
a first gear group which is disposed on the first input shaft and which includes a plurality of gears which are selectively connected to the first input shaft via a first changeover unit;
a second gear group which is disposed on the second input shaft and which includes a plurality of gears which are selectively connected to the second input shaft via a second changeover unit; and
a third gear group which is disposed on the output/input shaft and which includes a plurality of gears with which the gears of the first gear group and the gears of the second gear group mesh,
wherein, when the vehicle is decelerated during an EV running by selecting a high-speed side gear of the first gear group, a braking force during a downshift is ensured by actuating wheel brakes in a cooperative fashion so as to compensate for a reduction in regenerative braking force of the electric motor during a downward gear change from the high-speed side gear to a low-speed side gear while regeneration is brought about by the electric motor.

2. The system of claim 1,
wherein the first changeover unit is a synchro clutch.

3. The system of claim 1,
wherein, when a vehicle speed is decreased to a predetermined value by bringing about a regeneration by selecting the low-speed side gear, the regeneration is stopped, and a lower-speed side gear which is lower than the low-speed side gear is selected.

4. The system of claim 1,
wherein a regeneration amount can be increased in accordance with a pedal effort applied to a brake pedal, and a braking force is ensured by controlling a hydraulic pressure of a master cylinder for the first time after the regeneration amount reaches a regeneration limit.

5. A vehicle driving system comprising an internal combustion engine and an electric motor, the system comprising:
an internal combustion engine output shaft by which power is outputted from the internal combustion engine;
a first input shaft which is disposed parallel to the internal combustion engine output shaft and which is selectively connected to the internal combustion engine output shaft by a first engaging and disengaging unit;
a second input shaft which is disposed parallel to the internal combustion engine output shaft and which is selectively connected to the internal combustion engine output shaft by a second engaging and disengaging unit;
an output/input shaft which is disposed parallel to the internal combustion engine output shaft and which outputs power to a driven portion;
a first gear group which is disposed on the first input shaft and which includes a plurality of gears which are selectively connected to the first input shaft via a first changeover unit;
a second gear group which is disposed on the second input shaft and which includes a plurality of gears which are selectively connected to the second input shaft via a second changeover unit; and
a third gear group which is disposed on the output/input shaft and which includes a plurality of gears with which the gears of the first gear group and the gears of the second gear group mesh,
wherein, when the vehicle is decelerated during an EV running by selecting a high-speed side gear of the first gear group, a braking force during a downshift is ensured by making use of engine braking effects by engaging the second engaging and disengaging unit in such a state that the internal combustion engine is started and one of the gears of the second gear group is selected by the second changeover unit during a downward gear change from the high-speed side gear of the first gear group to a low-speed side gear of the first gear group while regeneration is brought about by the electric motor.

6. The system of claim 5,
wherein the system estimates a deceleration request, and
wherein, when a deceleration request to the low-speed side gear of the first gear group is made while the regeneration is being brought about by the high-speed side gear of the first gear group, engine braking is once attained in such a state that the gear of the second gear group is selected, and a pre-downshift from the high-speed gear of the first gear group to the low-speed side gear of the first gear group is made while the vehicle is running on the gear of the second gear group.

7. The system of claim 5,
wherein the first changeover unit is a synchro clutch.

8. The system of claim 5,
wherein, when a vehicle speed is decreased to a predetermined value by bringing about a regeneration by selecting the low-speed side gear, the regeneration is stopped, and a low-speed side gear which is lower than the low-speed side gear is selected.

* * * * *